(12) United States Patent
Yukawa et al.

(10) Patent No.: US 8,053,084 B2
(45) Date of Patent: Nov. 8, 2011

(54) AQUEOUS COATING COMPOSITION

(75) Inventors: Yoshiyuki Yukawa, Aichi (JP); Takayuki Ono, Aichi (JP)

(73) Assignee: Kansai Paint Co., Ltd., Hyogo (JP)

( * ) Notice: Subject to any disclaimer, the term of this patent is extended or adjusted under 35 U.S.C. 154(b) by 387 days.

(21) Appl. No.: 12/385,244

(22) Filed: Apr. 2, 2009

(65) Prior Publication Data
US 2009/0252879 A1 Oct. 8, 2009

(30) Foreign Application Priority Data

Apr. 2, 2008 (JP) .................. 2008-096529

(51) Int. Cl.
*B32B 27/30* (2006.01)
*B05D 1/36* (2006.01)
*C08K 5/1545* (2006.01)
*C08K 5/3432* (2006.01)

(52) U.S. Cl. ..... 428/500; 106/498; 427/402; 427/407.1; 524/86; 524/87; 524/89; 524/90; 524/91; 524/95; 524/96; 524/97; 524/99; 524/102; 524/104; 524/107; 524/109; 524/110; 524/186

(58) Field of Classification Search .......... None
See application file for complete search history.

(56) References Cited

U.S. PATENT DOCUMENTS

| | | | |
|---|---|---|---|
| 5,348,580 A | 9/1994 | Chassot | |
| 5,662,739 A | 9/1997 | Urban et al. | |
| 5,746,820 A | 5/1998 | Urban et al. | |
| 2005/0187313 A1* | 8/2005 | He et al. ............. | 523/160 |

FOREIGN PATENT DOCUMENTS

| | | |
|---|---|---|
| EP | 1 693 429 | 8/2006 |
| GB | 976084 | 11/1964 |
| JP | 6-228496 | 8/1994 |
| JP | 7-268234 | 10/1995 |
| JP | 2002-30253 | 1/2002 |
| WO | 2007/043633 | 4/2007 |

OTHER PUBLICATIONS

Combined Search and Examination Report dated Jul. 24, 2009 issued in Great Britain Application corresponding to present U.S. Application.

* cited by examiner

*Primary Examiner* — Michael J Feely
(74) *Attorney, Agent, or Firm* — Wenderoth, Lind & Ponack, L.L.P.

(57) ABSTRACT

The present invention provides an aqueous coating composition that can form a coated film having excellent appearance, in which a change in the color of the coating composition during the storage of the coating composition is prevented or suppressed, excellent storage stability is provided, and the generation of popping is prevented or suppressed; and a method for forming a coated film. The aqueous coating composition contains (A1) a film-forming aqueous resin, (B) a dioxazine pigment, (C) a hydrophobic solvent and (D) a resin having an aromatic ring with a nitro group bonded thereto, and a method for forming a coated film using the composition.

13 Claims, No Drawings

AQUEOUS COATING COMPOSITION

TECHNICAL FIELD

The present invention relates to an aqueous coating composition and a method for forming a coated film using the aqueous coating composition.

BACKGROUND ART

Painting the bodies of automobiles is generally conducted by applying an electrodeposition coating composition as a primer coating composition, applying an intermediate-coating composition, and then applying a topcoat coating composition.

Examples of methods of applying the topcoat coating composition include a one-coat one-bake method, in which one kind of topcoat coating composition is applied and cured with heating; a two-coat one-bake method, in which two kinds of topcoat coating compositions (a base coating composition and a clear coating composition) are used, first by applying the base coating composition, then applying the clear coating composition on top of the uncured coating composition, and simultaneously curing the two coated films with heating; etc. Among these, in the application by the two-coat one-bake method, improvement in the design properties of the coated film is achieved by the widely carried-out usage of a coloring base coating composition containing a coloring pigment as the base coating composition. Among the above-mentioned coloring pigments, dioxazine pigments are widely used as purple coloring pigments (for example, Patent Document 1).

Heretofore, solvent-type heat-curable coating compositions that comprise a combination of a base resin (a base polymer) component such as an acrylic resin, a polyester resin, an alkyd resin having a hydroxyl group, a carboxyl group or other cross-linking functional group and a curing agent such as an amino resin, a blocked or unblocked polyisocyanate compound and an epoxy compound have been widely used as the above-mentioned coloring base coating composition.

Recently, for the purposes of environmental preservation and resource conservation, the use of aqueous coating compositions has increased. For this reason, in the above-mentioned coloring base coating composition, the switch from known solvent-type heat-curable coating compositions to aqueous heat-curable coating compositions has been made.

However, when a temperature abruptly rises during the heating and curing process, a phenomenon called "popping" is generally known to occur on the cured coated film formed from such an aqueous heat-curable coating composition. Popping is a foam-like flaw of a coated film on the surface of the coated film, where a solvent remaining inside the coated film abruptly evaporates during heating and curing, or produces a bubble inside the coated film while a resin component within the coated film is solidified, whereby a portion where a bubble is produced appears to be a foam-like flaw. This popping is also referred to as a pinhole.

Since popping is produced by the abrupt evaporation of the solvent within the coated film during heating and curing, it is generally lessened by using an organic solvent having a relatively high boiling point as the solvent within the coating composition, and lowering the evaporation rate of the solvent. However, the main component of the solvent of the aqueous coating composition is water, and the amount of organic solvent having a relatively high boiling point is limited. Therefore, popping is more likely to occur in the aqueous solution than in a solvent-type coating composition.

To address such a problem, methods for suppressing popping by using a hydrophobic solvent in the aqueous coating composition have been suggested. For example, Patent Document 2 states that an aqueous coating composition containing an organic solvent with a solubility of 10 or lower in water and in an internally cross-linked resin emulsion can provide a coated film having a homogeneous appearance of the coated film and that can suppress the generation of pinholes (popping).

Patent Document 3 states that when an aqueous coating composition that mainly comprises an aqueous dispersion of the reaction product obtained by neutralizing a product of a carboxyl group-containing reaction comprising an aromatic epoxy resin and a carboxyl group-containing acrylic resin with a basic compound, and dispersing the product in a solvent mainly composed of water that contains (a) a water-miscible organic solvent comprising 30 to 70 weight % of an ether alcohol solvent having a boiling point of 175 to 240° C. and 70 to 30 weight % of alkanol having a boiling point of 140° C. or lower, and (b) a non-water miscible organic solvent comprising 20 to 80 weight % of a hydrocarbon solvent having a boiling point of 170 to 240° C. and 80 to 20 weight % of a higher alcohol solvent having a boiling point of 150 to 200° C., an aqueous coating composition having excellent film-forming properties, anti-popping properties and coating composition stability can be obtained.

However, when the above-mentioned aqueous coating composition containing the hydrophobic solvent uses the dioxazine pigment as a coloring pigment, it has problematic color variation during the storage of the coating composition.

PRIOR ART DOCUMENTS

Patent Document 1: Japanese Unexamined Patent Publication No. 1995-268234
Patent Document 2: Japanese Unexamined Patent Publication No. 2002-30253
Patent Document 3: Japanese Unexamined Patent Publication No. 1994-228496

SUMMARY OF THE INVENTION

Object to be Achieved by the Invention

An object of the present invention is to provide an aqueous coating composition containing a dioxazine pigment and a hydrophobic solvent that can prevent or suppress the generation of popping on a coated film formed, and having excellent storage stability so that a change in the color of the coating composition during the storage of the coating composition can be prevented or suppressed. Moreover, another object of the present invention is to provide a method for forming a multi-layer coated film using the aqueous coating composition.

That is, the present invention provides the following aqueous coating composition, a method for forming a multi-layer coated film using the aqueous coating composition, and an article on which the aqueous coating composition is applied.

1. An aqueous coating composition comprising (A1) a film-forming aqueous resin, (B) a dioxazine pigment, (C) a hydrophobic solvent and (D) a resin having an aromatic ring with a nitro group bonded thereto.
2. An aqueous coating composition according to item 1 above, which further comprises a curing agent (A2).
3. An aqueous coating composition according to item 2 above, wherein the film-forming aqueous resin (A1) is a core-shell-type water-dispersible hydroxy-containing acrylic resin (A1-1') comprising a core portion that is a copolymer (I) comprising, as copolymer components, about 0.1 to about 30 mass % of a polymerizable unsaturated monomer having two or more polymerizable unsaturated groups per molecule, and about 70 to about 99.9 mass % of a polymerizable unsaturated monomer having one polymerizable unsaturated group per molecule, and a shell portion that is a copolymer (II) comprising, as copolymer components, about 1 to about 40 weight % of a hydroxy-containing polymerizable unsaturated monomer, 5 to 50 mass % of a hydrophobic polymerizable unsaturated monomer and 10 to 94 mass % of other polymerizable unsaturated monomer, and the mass ratio of the copolymer (I)/copolymer (II) is in the range from about 10/90 to about 90/10 on a solids content basis.

4. An aqueous coating composition according to any one of items 1 to 3 above, wherein the dioxazine pigment (B) is C. I. Pigment Violet 23 (C. I. No. 51319).

5. An aqueous coating composition according to any one of items 1 to 4 above, wherein the hydrophobic solvent (C) is at least one hydrophobic solvent selected from the group consisting of 1-octanol, 2-octanol, 2-ethyl-1-hexanol, ethylene glycol mono-2-ethylhexyl ether, propylene glycol mono n-butyl ether, and dipropylene glycol mono n-butyl ether.

6. An aqueous coating composition according to any one of items 1 to 5 above, wherein the resin (D) having an aromatic ring with a nitro group bonded thereto is a copolymer that can be obtained by copolymerization of monomer components comprising a polymerizable unsaturated monomer (a) represented by Formula (1) below Formula 1

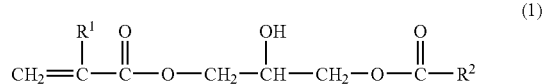

(1)

(wherein $R^1$ represents a hydrogen atom or a methyl group; and $R^2$ represents an aromatic ring having a nitro group bonded thereto) and (b) other polymerizable unsaturated monomer.

7. An aqueous coating composition according to item 6 mentioned above, wherein the polymerizable unsaturated monomer (a) is a polymerizable unsaturated monomer represented by the following Formula (2)

Formula 2

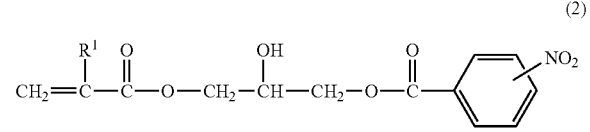

(2)

(wherein $R^1$ represents a hydrogen atom or a methyl group).

8. An aqueous coating composition according to item 6 or 7 above, wherein the mass ratio of the polymerizable unsaturated monomer (a) to the other polymerizable unsaturated monomer (b) is in the range of from 5/95 to 50/50.

9. An aqueous coating composition according to any one of items 6 to 8 above, wherein the other polymerizable unsaturated monomer (b) contains, as a part of the monomer (b), a polymerizable unsaturated monomer having a polyoxyalkylene chain in an amount of 5 to 50 mass %, based on the total mass of the polymerizable unsaturated monomer (a) and the monomer (b).

10. An aqueous coating composition according to any one of items 1 to 9 above, wherein the film-forming aqueous resin (A1), the dioxazine pigment (B), the hydrophobic solvent (C) and the resin (D) having an aromatic ring with a nitro group bonded thereto are contained in the following amounts: 0.01 to 15 mass parts of the dioxazine pigment (B), 10 to 120 mass parts of the hydrophobic solvent (C), based on 100 mass parts of the film-forming aqueous resin (A1), and 20 to 300 mass parts of the resin (D) having an aromatic ring with a nitro group bonded thereto, based on 100 mass parts of the dioxazine pigment (B).

11. An article on which an aqueous coating composition according to any one of items 1 to 10 above is applied.

12. A method for forming a multi-layer coated film comprising (1) a step in which an aqueous coating composition according to any one of items 1 to 10 above is applied onto a substrate, to form a base coating,
(2) a step in which a clear coating composition is applied onto the above-mentioned uncured base coating surface to form a clear coating, and
(3) a step in which the above-mentioned uncured base coating and uncured clear coating are heated to cure both coated films simultaneously.

13. An article coated by a method for forming a multi-layer coated film according to item 12 above.

Effect of the Invention

The aqueous coating composition of the present invention contains the film-forming aqueous resin (A1), the dioxazine pigment (B), the hydrophobic solvent (C) and the resin (D) having an aromatic ring with a nitro group bonded thereto, whereby the coating composition has excellent storage stability such that a change in the color of the composition during storage is prevented or suppressed; and the composition can form a coating film with an excellent appearance such that popping is prevented or suppressed.

MODE FOR CARRYING OUT THE INVENTION

The aqueous coating composition of the present invention will be described below in detail.

The aqueous pigment dispersion of the present invention is an aqueous coating composition that contains the film-forming aqueous resin (A1), the dioxazine pigment (B), the hydrophobic solvent (C) and the resin (D) having an aromatic ring with a nitro group bonded thereto.

Film-Forming Aqueous Resin (A1)

Resins that are usable as the film-forming aqueous resin (A1) include inherently known water-soluble or water-dispersible film-forming resins that have been conventionally used as binder components of the aqueous coating composition. Examples of the resin include acrylic resins, polyester resins, alkyd resins and polyurethane resins, etc. The film-forming aqueous resin (A1) preferably has a cross-linking functional group such as a hydroxyl group, a carboxyl group, an epoxy group, a carbodiimide group, a carbonyl group, a hydrazide group and a semicarbazide group.

The aqueous coating composition of the present invention may further comprise the curing agent (A2). When the curing agent (A2) is contained, a resin (base resin) having a cross-linking functional group such as a hydroxyl group, a carboxyl group and an epoxy group, and being capable of forming a cured coating by reacting with the curing agent (A2) is normally used as the film-forming aqueous resin (A1). Examples of the above-mentioned base resin include acrylic resins, polyester resins, alkyd resins and polyurethane resins, etc.

The above-mentioned base resin is particularly preferably a hydroxy-containing resin, and is more particularly preferably a hydroxy-containing acrylic resin (A1-1) and/or a hydroxy-containing polyester resin (A1-2). Moreover, it is more preferable to use the hydroxy-containing acrylic resin (A1-1) and the hydroxy-containing polyester resin (A1-2) in combination from the perspective of improving the smoothness and luster of the coated film (flip-flop property). When used in combination, the amount of the hydroxy-containing acrylic resin (A1-1) is preferably about 20 to about 80 mass %, in particular about 30 to about 70 mass %, based on their total amount, and the amount of the hydroxy-containing polyester resin (A1-2) is preferably about 80 to about 20 mass %, in particular about 70 to about 30 mass %, based on their total amount.

When the film-forming aqueous resin (A1) has an acid group such as a carboxyl group, its acid value is preferably about 5 to about 150 mg KOH/g, more preferably about 10 to about 100 mg KOH/g, and even more preferably about 15 to about 80 mg KOH/g. Moreover, when the resin (A1) has a hydroxyl group, its hydroxy value is preferably about 1 to about 200 mg KOH/g, more preferably about 2 to about 180 mg KOH/g, and even more preferably about 5 to about 170 mg KOH/g.

Hydroxy-Containing Acrylic Resin (A1-1)

As the hydroxy-containing acrylic resin (A1-1), from the perspective of improving the smoothness and luster of the formed coated film, it is preferable to use a core-shell type water-dispersible hydroxy-containing acrylic resin singly, or a core-shell type water-dispersible hydroxy-containing acrylic resin and a water-soluble acrylic resin in combination.

A preferable core-shell type water-dispersible hydroxy-containing acrylic resin is a resin (A1-1') that comprises a core portion that is a copolymer (I) comprising, as copolymer components, about 0.1 to about 30 mass % of a polymerizable unsaturated monomer having at least two polymerizable unsaturated groups per molecule and about 70 to about 99.9 mass % of a polymerizable unsaturated monomer having a polymerizable unsaturated group per molecule, and a shell portion which is a copolymer (II) comprising, as copolymer components, about 1 to about 40 weight % of a hydroxy-containing polymerizable unsaturated monomer, about 5 to about 50 mass % of a hydrophobic polymerizable unsaturated monomer and about 10 to about 94 mass % of other polymerizable unsaturated monomer. A coated film having excellent smoothness, flip-flop property and water resistance can be obtained by using the above-mentioned core-shell type water-dispersible hydroxy-containing acrylic resin (A1-1') and the hydrophobic solvent (C) in combination in the aqueous coating composition of the present invention. The mass ratio of copolymer (I)/copolymer (II) is preferably about 10/90 to about 90/10, more preferably about 50/50 to about 85/15, and even more preferably about 65/35 to about 80/20, on a solids content basis, from the perspective of improving the appearance of the coated film.

The term "polymerizable unsaturated group" in this specification means an unsaturated group that can undergo radical polymerization. Examples of such a polymerizable unsaturated group include a vinyl group and a (meth)acryloyl group, etc.

The term "(meth)acrylate" used in this specification means "acrylate or methacrylate". The term "(meth)acrylic acid" means "acrylic acid or methacrylic acid", and the term "(meth)acryloyl" means "acryloyl or methacryloyl". Additionally, the term "(meth)acrylamide" means "acrylamide or methacrylamide".

In this specification, the terms "number average molecular weight" and "weight average molecular weight" refer to the values obtained by converting the number average molecular weight and the weight average molecular weight as determined by a gel permeation chromatograph, and expressed in terms of the molecular weight of standard polystyrene. More specifically, using "HLC8120GPC" (tradename, Tosoh Corporation) as a gel permeation chromatograph, and four columns "TSKgel G-4000HXL", "TSKgel G-3000HXL", "TSKgel G-2500HXL", and "TSKgel G-2000HXL" (tradenames, Tosoh Corporation), the molecular weights were determined by an RI detector using tetrahydrofuran as the mobile phase at a temperature of 40° C. at a flow rate of 1 mL/min.

Examples of a polymerizable unsaturated monomer having two or more polymerizable unsaturated groups per molecule used as a monomer for core copolymer (I) include allyl(meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-tris-hydroxymethylethane di(meth)acrylate, 1,1,1-tris-hydroxymethylethane tri(meth)acrylate, 1,1,1-tris-hydroxymethylpropane tri(meth)acrylate, triallyl isocyanurate, diallyl terephthalate, divinylbenzene, etc. Such monomers can be used singly or in a combination of two or more.

The above-mentioned polymerizable unsaturated monomer having two or more polymerizable unsaturated groups per molecule functions to provide a cross-linked structure to the core copolymer (I). The amount of the polymerizable unsaturated monomer having two or more polymerizable unsaturated groups per molecule can be suitably selected according to the degree of cross-linking of the core copolymer (I). Usually, the amount is preferably about 0.1 to about 30 mass %, more preferably about 0.5 to about 10 mass %, and even more preferably about 1 to about 7 mass %, based on the total mass of the polymerizable unsaturated monomer having two or more polymerizable unsaturated groups per molecule and the polymerizable unsaturated monomer having one polymerizable unsaturated groups per molecule.

Examples of the above-mentioned usable polymerizable unsaturated monomer having two or more polymerizable unsaturated groups per molecule include methylene bis(meth)acrylamide, ethylene bis(meth)acrylamide, and like amide group-containing monomers. When the amide group-containing monomer is used, the metallic mottling of the obtained coated film can be advantageously suppressed. When this amide group-containing monomer is used, the amount used is preferably about 0.1 to about 25 mass %, more preferably about 0.5 to about 8 mass %, and even more preferably about 1 to about 4 mass %, based on the total mass of the polymerizable unsaturated monomer having two or more polymerizable unsaturated groups per molecule and the polymerizable unsaturated monomer having one polymerizable unsaturated groups per molecule.

The polymerizable unsaturated monomer having one polymerizable unsaturated group per molecule used as a monomer for core copolymer (I) is a polymerizable unsaturated monomer that can be polymerized with the above-mentioned polymerizable unsaturated monomer having two or more polymerizable unsaturated groups per molecule.

Specific examples of the polymerizable unsaturated monomer having one polymerizable unsaturated group per molecule include alkyl or cycloalkyl(meth)acrylates such as methyl(meth)acrylate, ethyl(meth)acrylate, n-propyl(meth)acrylate, i-propyl(meth)acrylate, n-butyl(meth)acrylate, i-butyl(meth)acrylate, tert-butyl(meth)acrylate, n-hexyl(meth)acrylate, n-octyl(meth)acrylate, 2-ethylhexyl(meth)acrylate, nonyl(meth)acrylate, tridecyl(meth)acrylate, lauryl(meth)acrylate, stearyl(meth)acrylate, "Isostearyl Acrylate" (tradename, Osaka Organic Chemical Industry, Ltd.), cyclohexyl(meth)acrylate, methylcyclohexyl(meth)acrylate, t-butylcyclohexyl(meth)acrylate, cyclododecyl(meth)acrylate, and tricyclodecanyl(meth)acrylate; isobornyl-containing polymerizable unsaturated monomers such as isobornyl(meth)acrylate; adamantyl-containing polymerizable unsaturated monomers such as adamantyl(meth)acrylate; tricyclodecenyl-containing polymerizable unsaturated monomers such as tricyclodecenyl(meth)acrylate; aromatic ring-containing polymerizable unsaturated monomers such as benzyl(meth)acrylate, styrene, a-methylstyrene and vinyltoluene; alkoxysilyl-containing polymerizable unsaturated monomers such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl(meth)acrylates such as perfluorobutylethyl(meth)acrylate and perfluorooctylethyl(meth)acrylate; fluorinated alkyl-containing polymerizable unsaturated monomers such as fluoroolefins; polymerizable unsaturated monomers having photopolymerizable functional groups such as a maleimide group; vinyl compounds such as N-vinylpyrrolidone, ethylene, butadiene, chloroprene, vinyl propionate and vinyl acetate; hydroxy-containing polymerizable unsaturated monomers such as monoesterified products of (meth)acrylic acid with a dihydric alcohol containing 2 to 8 carbon atoms such as 2-hydroxyethyl(meth)acrylate, 2-hydroxypropyl(meth)acrylate, 3-hydroxypropyl(meth)acrylate and 4-hydroxybutyl(meth)acrylate, e-caprolactone-modified products of the monoesterified products, N-hydroxymethyl(meth)acrylamide, allyl alcohol, and (meth)acrylates having hydroxy-terminated polyoxyethylene chains; carboxy-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl(meth)acrylate, N,N-diethylaminoethyl(meth)acrylate, N,N-dimethylaminopropyl(meth)acrylamide and adducts of glycidyl(meth)acrylate with amines; epoxy-containing polymerizable unsaturated monomers such as glycidyl(meth)acrylate, β-methylglycidyl(meth)acrylate, 3,4-epoxycyclohexylmethyl(meth)acrylate, 3,4-epoxycyclohexylethyl(meth)acrylate, 3,4-epoxycyclohexylpropyl(meth)acrylate and allyl glycidyl ether; and (meth)acrylates having alkoxy-terminated polyoxyethylene chains. These monomers can be used singly or in a combination of two or more, depending on the performance required for the core-shell type water-dispersible hydroxy-containing acrylic resin (A1-1').

The hydroxy-containing polymerizable unsaturated monomer used as the monomer for the shell copolymer (II) functions to improve the water resistance and other properties of the coated film by introducing a hydroxyl group which undergoes a crosslinking reaction with the curing agent (A2) into the obtained core-shell-type water-dispersible hydroxy-containing acrylic resin, and improve the stability of the water-dispersible acrylic resin in the aqueous medium. Examples of the hydroxy-containing polymerizable unsaturated monomers include monoesterified products of (meth)acrylic acid with a dihydric alcohol containing 2 to 8 carbon atoms (e.g., 2-hydroxyethyl(meth)acrylate, 2-hydroxypropyl(meth)acrylate, 3-hydroxypropyl(meth)acrylate, 4-hydroxybutyl(meth)acrylate); e-caprolactone-modified products of the monoesterified products; N-hydroxymethyl(meth)acrylamide, allyl alcohol, and (meth)acrylate having a polyoxyethylene chain with a terminal hydroxyl group. These monomers can be used singly or in a combination of two or more. Preferable hydroxy-containing polymerizable unsaturated monomers used are 2-hydroxyethyl(meth)acrylate, 2-hydroxypropyl(meth)acrylate, 3-hydroxypropyl(meth)acrylate and 4-hydroxybutyl(meth)acrylate, etc.

The amount of the above-mentioned hydroxy-containing polymerizable unsaturated monomer used is preferably about 1 to about 40 mass %, more preferably about 4 to about 25 mass %, and even more preferably about 7 to about 19 mass %, based on the total mass of the monomers constituting the shell copolymer (II), from the perspective of excellent stability of the core-shell type water-dispersible hydroxy-containing acrylic resin (A1-1') in the aqueous medium and water resistance of the obtained coated film.

The hydrophobic polymerizable unsaturated monomer used as a monomer for the shell copolymer (II) is a polymerizable unsaturated monomer containing a linear, branched, or cyclic, saturated or unsaturated hydrocarbon group containing 6 or more carbon atoms, preferably 6 to about 18 carbon atoms, excluding monomers containing a hydrophilic group, such as hydroxy-containing polymerizable unsaturated monomers. Examples of such monomers include alkyl or cycloalkyl(meth)acrylates such as n-hexyl(meth)acrylate, octyl(meth)acrylate, 2-ethylhexyl(meth)acrylate, nonyl(meth)acrylate, tridecyl(meth)acrylate, lauryl(meth)acrylate, stearyl(meth)acrylate, "Isostearyl Acrylate" (tradename, Osaka Organic Chemical Industry, Ltd.), cyclohexyl(meth)acrylate, methylcyclohexyl(meth)acrylate, t-butylcyclohexyl(meth)acrylate, cyclododecyl(meth)acrylate, tricyclodecanyl(meth)acrylate; isobornyl-containing polymerizable unsaturated compounds such as isobornyl (meth)acrylate; adamantyl-containing polymerizable unsaturated compounds such as adamantyl(meth)acrylate; aromatic ring-containing polymerizable unsaturated monomers such as benzyl(meth)acrylate, styrene, a-methyl styrene and vinyltoluene. These monomers can be used singly or in a combination of two or more.

A polymerizable unsaturated monomer having a $C_{6-18}$ alkyl group and/or an aromatic ring-containing polymerizable unsaturated monomer is preferably used as the hydrophobic polymerizable unsaturated monomer, from the viewpoint of enhancing the smoothness and distinctness of image of the obtained coating film. Styrene is particularly preferable.

The amount of the above-mentioned hydrophobic polymerizable unsaturated monomer used is preferably about 5 to about 50 by mass, more preferably about 7 to about 40 mass %, and even more preferably about 9 to about 30 mass %, based on the total mass of the monomers constituting the shell copolymer (II), from the perspective of excellent stability of the core-shell type water-dispersible hydroxy-containing acrylic resin (A1-1') in the aqueous medium and water resistance of the obtained coated film.

Other polymerizable unsaturated monomer used as a monomer for the shell copolymer (II) is a polymerizable unsaturated monomer other than the hydroxy-containing polymerizable unsaturated monomer and the hydrophobic polymerizable unsaturated monomer. Examples of such monomers include alkyl or cycloalkyl(meth)acrylates such as methyl(meth)acrylate, ethyl(meth)acrylate, n-propyl(meth)acrylate, i-propyl(meth)acrylate, n-butyl(meth)acrylate, i-butyl(meth)acrylate and tert-butyl(meth)acrylate; and carboxy-containing polymerizable unsaturated monomers, etc. These monomers can be used singly or in combination of two or more.

Specific examples of the above-mentioned carboxy-containing polymerizable unsaturated monomer are the same as mentioned as examples of monomers for the core copolymer (I). It is particularly preferable to use acrylic acid and/or methacrylic acid as the carboxy-containing polymerizable unsaturated monomer. By using the above-mentioned carboxy-containing polymerizable unsaturated monomer as the polymerizable unsaturated monomer, the obtained core-shell type water-dispersible hydroxy-containing acrylic resin (A1-1') is provided with excellent stability in an aqueous medium.

When the above-mentioned carboxy-containing polymerizable unsaturated monomer is used, the amount used is preferably about 1 to about 30 by mass, more preferably about 5 to about 25 mass %, and even more preferably about 7 to about 19 mass %, based on the total mass of the monomers constituting the shell copolymer (II), from the perspective of excellent stability of the core-shell type water-dispersible hydroxy-containing acrylic resin (A1-1') in the aqueous medium and water resistance of the obtained coated film.

It is preferable that the polymerizable unsaturated monomer having two or more polymerizable unsaturated groups per molecule is not used as the other polymerizable unsaturated monomer used as a monomer for the shell copolymer (II) and the copolymer the copolymer (II) is an uncross-linked copolymer, from the perspective of improving the obtained coated film luster.

The mass ratio of copolymer (I)/copolymer (II) in the core-shell type water-dispersible hydroxy-containing acrylic resin (A1-1') is preferably about 10/90 to about 90/10, more preferably about 50/50 to about 85/15, even more preferably about 65/35 to about 80/20, on a solids content basis, from the perspective of improving the coated film luster.

The core-shell-type water-dispersible hydroxy-containing acrylic resin (A1-1') preferably has a hydroxy value of about 1 to about 70 mg KOH/g, more preferably about 2 to about 50 mg KOH/g, and even more preferably about 5 to about 30 mg KOH/g, from the perspective of excellent water resistance and other properties of the obtained coated film.

The core-shell type water-dispersible hydroxy-containing acrylic resin (A1-1') preferably has an acid value of about 5 to about 90 mg KOH/g, more preferably about 8 to about 50 mg KOH/g, and even more preferably about 10 to about 35 mg KOH/g, from the perspective of excellent storage stability of the coating composition and water resistance and other properties of the obtained coated film.

The core-shell type water-dispersible hydroxy-containing acrylic resin (A1-1') is obtained by a process comprising: subjecting to emulsion polymerization a monomer mixture of about 0.1 to about 30 mass % of the polymerizable unsaturated monomer having two or more polymerizable unsaturated groups per molecule and about 70 to about 99.9 mass % of the polymerizable unsaturated monomer having one polymerizable unsaturated group per molecule to form an emulsion of the core copolymer (I); adding to this emulsion a monomer mixture of about 1 to about 40 mass % of the hydroxy-containing polymerizable unsaturated monomer, about 5 to about 50 mass % of the hydrophobic polymerizable unsaturated monomer, and about 10 to about 94 mass % of the other polymerizable unsaturated monomer; and further performing emulsion polymerization to form the shell copolymer (II).

The emulsion polymerization for preparing an emulsion of the core copolymer (I) can be carried out according to a known method. For example, the emulsion can be prepared by subjecting the monomer mixture to emulsion polymerization in the presence of an emulsifier using a polymerization initiator.

The emulsifier is preferably an anionic emulsifier or a nonionic emulsifier. Examples of anionic emulsifiers include sodium salts and ammonium salts of alkylsulfonic acids, alkylbenzenesulfonic acids, alkylphosphoric acids, etc. Examples of nonionic emulsifiers include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate, etc. Other examples of usable emulsifiers include polyoxyalkylene-containing anionic emulsifiers that have an anionic group and a polyoxyalkylene group, such as a polyoxyethylene group or a polyoxypropylene group, per molecule; and reactive anionic emulsifiers that have an anionic group and a radically polymerizable unsaturated group per molecule. Among these, reactive anionic emulsifiers are preferable.

Examples of reactive anionic emulsifiers include sodium salts of sulfonic acid compounds having a radically polymerizable unsaturated group, such as (meth)allyl, (meth)acryloyl, propenyl, butenyl or the like, ammonium salts of such sulfonic acid compounds, etc. Among these, ammonium salts of sulfonic acid compounds having a radically polymerizable unsaturated group are preferable in view of the excellent water resistance of the obtained coated film. Commercially available ammonium salts of such sulfonic acid compounds include "LATEMULS-180A" (tradename, Kao Corporation), etc.

Among the ammonium salts of sulfonic acid compounds having a radically polymerizable unsaturated group, ammonium salts of sulfonic acid compounds having a radically polymerizable unsaturated group and a polyoxyalkylene group are particularly preferable. Commercially available ammonium salts of sulfonic acid compounds having a radically polymerizable unsaturated group and a polyoxyalkylene group include "Aqualon KH-10" (tradename, Dai-Ichi Kogyo Seiyaku Co., Ltd.), "SR-1025" (tradename, ADEKA Co., Ltd.), "LATEMUL PD-104" (tradename, Kao Corporation), etc. The amount of emulsifier used is preferably about 0.1 to about 15 mass %, more preferably about 0.5 to about 10 mass %, and even more preferably about 1 to about 5 mass %, based on the total mass of the monomers used.

Examples of polymerization initiators include organic peroxides such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropylcarbonate, tert-butyl peroxyacetate, diisopropylbenzene hydroperoxide, etc.; azo compounds such as azobisisobutyronitrile, azobis(2,4-dimethylvaleronitrile), azobis(2-methylpropiononitrile), azobis(2-methylbutyronitrile), 4,4'-azobis(4-cyanobutanoic acid), dimethyl azobis(2-methyl propionate), azobis(2-methyl-N-(2-hydroxyethyl)-propionamide), azobis(2-methyl-N-(2-(1-hydroxy butyl))-propionamide), etc.; persulfates such as potassium persulfate, ammonium persulfate, sodium persulfate, etc.; and the like. Such polymerization initiators can be used singly or in a combination of two or more. Redox initiators prepared by combining a polymerization initiator as mentioned above with a reducing agent such as sugar, sodium formaldehyde sulfoxylate, iron complex, etc. may also be used.

Usually, the amount of the polymerization initiator is preferably about 0.1 to about 5 mass %, and more preferably about 0.2 to about 3 mass %, based on the total mass of all the monomers used. The method of adding the polymerization initiator is not particularly limited, and can be suitably selected according to the kind, amount, etc. of the polymerization initiator used. For example, the polymerization initiator may be incorporated into a monomer mixture or an aqueous medium beforehand, or may be added dropwise or all at once at the time of polymerization.

The core-shell type water-dispersible hydroxy-containing acrylic resin (A1-1') can be obtained by adding to the above-obtained emulsion of the core copolymer (I) a monomer mixture of the hydroxy-containing polymerizable unsaturated monomer, the hydrophobic polymerizable unsaturated monomer and other polymerizable unsaturated monomer, and further performing polymerization to form the shell copolymer (II).

The monomer mixture for forming the shell copolymer (II) may optionally contain other components such as the polymerization initiators mentioned above, chain transfer agents, reducing agents, emulsifiers, etc. Although the monomer mixture may be added dropwise as is, it is preferably added dropwise as a monomer emulsion prepared by dispersing the monomer mixture into an aqueous medium. In this case, the particle size of the monomer emulsion is not particularly limited.

The method for polymerizing the monomer mixture for forming the shell copolymer (II) comprises, for example, adding the monomer mixture or emulsion thereof dropwise to the emulsion of the core copolymer (I) all at once or gradually, and heating to a suitable temperature while stirring.

The core-shell type water-dispersible hydroxy-containing acrylic resin (A1-1') thus obtained has a multiple-layer structure comprising a core copolymer (I) of a monomer mixture of the polymerizable unsaturated monomer having two or more polymerizable unsaturated groups per molecule and the polymerizable unsaturated monomer having one polymerizable unsaturated group per molecule, and a shell copolymer (II) of a monomer mixture of the hydroxy-containing polymerizable unsaturated monomer, the hydrophobic polymerizable unsaturated monomer and other polymerizable unsaturated monomer.

The core-shell type water-dispersible hydroxy-containing acrylic resin (A1-1') thus obtained usually has a mean particle size of about 10 to about 1,000 nm, and particularly about 20 to about 500 nm.

In this specification, the mean particle size of the core-shell-type water-dispersible hydroxy-containing acrylic resin refers to a value obtained by measurement at 20° C. using a submicron particle size distribution analyzer after dilution with deionized water according to a usual method. For example, a "COULTER N4" (tradename, Beckman Coulter, Inc.) can be used as the submicron particle size distribution analyzer.

To improve the mechanical stability of the particles of the core-shell type water-dispersible hydroxy-containing acrylic resin (A1-1'), acidic groups such as carboxyl groups of the water-dispersible acrylic resin are preferably neutralized with a neutralizing agent. Any neutralizing agent that can neutralize acidic groups can be used. Examples of the neutralizing agent include sodium hydroxide, potassium hydroxide, trimethylamine, 2-(dimethylamino)ethanol, 2-amino-2-methyl-1-propanol, triethylamine, aqueous ammonia, etc. The neutralizing agent is preferably used in an amount such that the pH of an aqueous dispersion of the neutralized water-dispersible acrylic resin is about 6.5 to about 9.0.

Hydroxyl Group-Containing Polyester Resin (A1-2)

In the coating composition of the invention, the use of a hydroxy-containing polyester resin (A1-2) as the film-forming aqueous resin (A1) improves the smoothness and other coated film performances of the obtained coated film.

The hydroxy-containing polyester resin (A1-2) can usually be produced by an esterification reaction or transesterification reaction of an acid component with an alcohol component.

The acid component may be a compound that is conventionally used as an acid component for producing a polyester resin. Examples of such acid components include aliphatic polybasic acids, alicyclic polybasic acids, aromatic polybasic acids, etc.

Generally, aliphatic polybasic acids are aliphatic compounds having at least two carboxyl groups per molecule; anhydrides of such aliphatic compounds; and esters of such aliphatic compounds. Examples of aliphatic polybasic acids include succinic acid, glutaric acid, adipic acid, pimelic acid, suberic acid, azelaic acid, sebacic acid, undecanedioic acid, dodecanedioic acid, brassylic acid, octadecanedioic acid, citric acid, and like aliphatic polycarboxylic acids; anhydrides of such aliphatic polycarboxylic acids; esters of such aliphatic polycarboxylic acids with about $C_1$ to about $C_4$ lower alkyls; etc. Such aliphatic polybasic acids can be used singly or in a combination of two or more.

In view of the smoothness of the obtained coated film, it is particularly preferable to use adipic acid and/or adipic anhydride as an aliphatic polybasic acid.

Generally, alicyclic polybasic acids are compounds having at least one alicyclic structure and at least two carboxyl groups per molecule; acid anhydrides of such compounds; and esters of such compounds. The alicyclic structure is mainly a 4- to 6-membered ring structure. Examples of alicyclic polybasic acids include 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, 1,3,5-cyclohexanetricarboxylic acid, and like alicyclic polycarboxylic acids; anhydrides of such alicyclic polycarboxylic acids; esters of such alicyclic polycarboxylic acids with about $C_1$ to about $C_4$ lower alkyls; etc. Such alicyclic polybasic acids can be used singly or in a combination of two or more.

In view of the smoothness of the obtained coated film, examples of preferable alicyclic polybasic acids include 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride. Among these, it is particularly preferable to use 1,2-cyclohexanedicarboxylic acid and/or 1,2-cyclohexanedicarboxylic anhydride.

Generally, aromatic polybasic acids include aromatic compounds having at least two carboxyl groups per molecule; anhydrides of such aromatic compounds; and esters of such aromatic compounds. Examples of aromatic polybasic acids include phthalic acid, isophthalic acid, terephthalic acid, naphthalenedicarboxylic acid, 4,4'-biphenyldicarboxylic acid, trimellitic acid, pyromellitic acid, and like aromatic polycarboxylic acids; anhydrides of such aromatic polycarboxylic acids; esters of such aromatic polycarboxylic acids with about $C_1$ to about $C_4$ lower alkyls; etc. Such aromatic polybasic acids can be used singly or in a combination of two or more.

It is preferable to use as the aromatic polybasic acids used at least one member selected from the group consisting of phthalic acid, phthalic anhydride, isophthalic acid, trimellitic acid, and trimellitic anhydride.

Acid components other than the above-mentioned aliphatic polybasic acids, alicyclic polybasic acids, and aromatic polybasic acids can also be used. Such acid components are not particularly limited, and include, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and like fatty acids; lauric acid, myristic acid, palmitic acid, stearic acid, oleic acid, linolic acid, linolenic acid, benzoic acid, p-tert-butyl benzoic acid, cyclohexanoic acid, 10-phenyloctadecanoic acid, and like monocarboxylic acids; lactic acid, 3-hydroxybutanoic acid, 3-hydroxy-4-ethoxybenzoic acid, and like hydroxycarboxylic acids. Such acid components can be used singly or in a combination of two or more.

Polyhydric alcohols having at least two hydroxyl groups per molecule can be preferably used as the above-mentioned alcohol component. Examples of such polyhydric alcohols include ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydrogenated bisphenol A, hydrogenated bisphenol F, and like dihydric alcohols; polylactone diols obtained by adding lactones, such as e-caprolactone, to such dihydric alcohols; bis(hydroxyethyl) terephthalate and like ester diols; alkylene oxide adducts of bisphenol A, polyethylene glycols, polypropylene glycols, polybutylene glycols, and like polyether diols; glycerol, trimethylolethane, trimethylolpropane, diglycerol, triglycerol, 1,2,6-hexanetriol, pentaerythritol, dipentaerythritol, tris(2-hydroxyethyl) isocyanuric acid, sorbitol, mannitol, and like trihydric or higher polyhydric alcohols; polylactone polyols obtained by adding lactones, such as e-caprolactone, to such trihydric or higher polyhydric alcohols; etc.

Alcohol components other than the above-mentioned polyhydric alcohols can also be used. Such other alcohol components are not particularly limited, and include, for example, methanol, ethanol, propyl alcohol, butyl alcohol, stearyl alcohol, 2-phenoxyethanol, and like monohydric alcohols; alcohol compounds obtained by reacting, with acids, monoepoxy compounds such as propylene oxide, butylene oxide, "Cardura E10" (tradename, Hexion Specialty Chemicals; a glycidyl ester of a synthetic highly branched saturated fatty acid), and the like; etc.

The method for producing the hydroxy-containing polyester resin (A1-2) is not particularly limited, and may be a conventional method. For example, the hydroxy-containing polyester resin can be produced by heating the acid component and alcohol component in a nitrogen stream at about 150 to about 250° C. for about 5 to about 10 hours to thereby carry out an esterification reaction or transesterification reaction of the acid component with the alcohol component.

For the esterification reaction or transesterification reaction, the acid component and alcohol component may be added to a reaction vessel at one time, or one or both of the components may be added in several portions. Alternatively, a hydroxy-containing polyester resin may be first synthesized and then reacted with an acid anhydride for half-esterification to thereby obtain a carboxy- and hydroxy-containing polyester resin. Further alternatively, a carboxy-containing polyester resin may be first synthesized, and the above-mentioned alcohol component may be added to obtain a hydroxy-containing polyester resin.

For promoting the esterification or transesterification reaction, per se known catalysts are usable, including, for example, dibutyltin oxide, antimony trioxide, zinc acetate, manganese acetate, cobalt acetate, calcium acetate, lead acetate, tetrabutyl titanate, tetraisopropyl titanate, etc.

The hydroxy-containing polyester resin (A1-2) can be modified with a fatty acid, monoepoxy compound, polyisocyanate compound, or the like, during or after the preparation of the resin.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, flaxseed oil fatty acid, tung oil fatty acid, rapeseed oil fatty acid, castor oil fatty acid, dehydrated castor oil fatty acid, safflower oil fatty acid, etc.

Preferable examples of the monoepoxy compound include "Cardura E10" (tradename, Hexion Specialty Chemicals, a glycidyl ester of a synthetic highly branched saturated fatty acid).

Examples of the polyisocyanate compound include lysine diisocyanate, hexamethylene diisocyanate, trimethylhexane diisocyanate, and like aliphatic diisocyanates; hydrogenated xylylene diisocyanate, isophorone diisocyanate, methylcyclohexane-2,4-diisocyanate, methylcyclohexane-2,6-diisocyanate, 4,4'-methylene bis(cyclohexylisocyanate), 1,3-di(isocyanatomethyl)cyclohexane, and like alicyclic diisocyanates; tolylene diisocyanate, xylylene diisocyanate, diphenylmethane diisocyanate, and like aromatic diisocyanates; organic polyisocyanates, such as lysine triisocyanate and like tri- or higher polyisocyanates; adducts of such organic polyisocyanates with polyhydric alcohols, low-molecular weight polyester resins, water, or the like; cyclopolymers (e.g., isocyanurate), biuret adducts, etc., of such organic polyisocyanates; etc. Such polyisocyanate compounds can be used singly or in a combination of two or more.

In view of the excellent smoothness and water resistance of the obtained coated film, the proportion of alicyclic polybasic acid is preferably about 20 to about 100 mol %, more preferably about 25 to about 95 mol %, and even more preferably about 30 to about 90 mol %, based on the total amount of acid component(s) used as starting materials to produce the hydroxy-containing polyester resin (A1-2). In view of the excellent smoothness of the obtained coated film, it is particularly preferable to use 1,2-cyclohexanedicarboxylic acid and/or 1,2-cyclohexanedicarboxylic anhydride as the alicyclic polybasic acid.

The hydroxy-containing polyester resin (A1-2) preferably has a hydroxy value of about 1 to about 200 mg KOH/g, more preferably about 2 to about 180 mg KOH/g, and even more preferably about 5 to about 170 mg KOH/g. When the hydroxy-containing polyester resin (A1-2) has a carboxyl group, the resin preferably has an acid value of about 5 to about 150 mg KOH/g, more preferably about 10 to about 100 mg KOH/g, and even more preferably about 15 to about 80 mg KOH/g. The hydroxy-containing polyester resin (A1-2) preferably has a number average molecular weight of about 500 to about 50,000, more preferably about 1,000 to about 30,000, and even more preferably about 1,200 to about 10,000.

Curing Agent (A2)

The curing agent (A2) is a compound that can react with cross-linkable functional groups such as a hydroxyl group, a carboxyl group and an epoxy group in the film-forming aqueous resin (A1), and cure the composition of the present invention. Examples of the curing agent (A2) include amino resins, polyisocyanate compounds, blocked polyisocyanate compounds, epoxy-containing compounds, carboxy-containing compounds, carbodiimide-containing compounds, hydrazide-containing compounds, semicarbazide-containing compounds, etc. Among these, amino resins and blocked polyisocyanate compounds that can react with a hydroxyl group and carbodiimide-containing compounds that can react with a carboxyl group are preferable, and amino resins are particularly preferable. The curing agent (A2) can be used singly or in combination of two or more.

The above-mentioned amino resin may be a partially or fully methylolated amino resin obtained by reacting an amino component with an aldehyde component. Examples of amino components include melamine, urea, benzoguanamine, acetoguanamine, steroguanamine, spiroguanamine, dicyandiamide, etc. Examples of aldehyde components include formaldehyde, paraformaldehyde, acetaldehyde, benzaldehyde, etc.

Methylolated amino resins in which some or all of the methylol groups have been etherified with a suitable alcohol can also be used. Examples of alcohols that can be used for the etherification include methyl alcohol, ethyl alcohol, n-propyl alcohol, i-propyl alcohol, n-butyl alcohol, i-butyl alcohol, 2-ethylbutanol, 2-ethylhexanol, etc.

Particularly preferable as the amino resin are melamine resins. Particularly preferable are methyl-etherified melamine resins obtained by etherifying some or all of the methylol groups of a partially or fully methylolated melamine resin with methyl alcohol; butyl-etherified melamine resins obtained by etherifying some or all of the methylol groups of a partially or fully methylolated melamine resin with butyl alcohol; and methyl-butyl-etherified melamine resins obtained by etherifying some or all of the methylol groups of a partially or fully methylolated melamine resin with methyl alcohol and butyl alcohol. Among these, methyl-butyl-etherified melamine resins are preferable.

The above-mentioned melamine resin has a weight average molecular weight of preferably about 400 to about 6,000, more preferably about 800 to about 5,000, even more preferably about 1,000 to about 4,000, and most preferably about 1,200 to about 3,000.

Commercially available melamine resins can be used as the melamine resin. Examples include commercially available products such as "Cymel 202", "Cymel 203", "Cymel 238", "Cymel 251", "Cymel 303", "Cymel 323", "Cymel 324", "Cymel 325", "Cymel 327", "Cymel 350", "Cymel 385", "Cymel 1156", "Cymel 1158", "Cymel 1116", "Cymel 1130" (products of Nihon Cytec Industries Inc.), "U-VAN 120", "U-VAN 20HS", "U-VAN 20SE60", "U-VAN 2021", "U-VAN 2028", "U-VAN 28-60" (products of Mitsui Chemicals, Inc.), etc.

In view of excellent flip-flop property and water resistance of the obtained coated film, it is preferable that the aqueous coating composition of the present invention contains the core-shell type water-dispersible hydroxy-containing acrylic resin (A1-1') as the film-forming aqueous resin (A1), and contains a melamine resin having a weight average molecular weight of about 1,000 to about 4,000, in particular about 1,200 to about 3,000 as the curing agent (A2).

When the melamine resin is used as the curing agent (A2), sulfonic acids such as paratoluene sulfonic acid, dodecyl benzenesulfonic acid, dinonylnaphthalene sulfonic acid; and salts of these sulfonic acids and amine compounds can be used as catalysts.

The blocked polyisocyanate compounds include compounds that are obtained by blocking isocyanate groups of a polyisocyanate compound having at least two isocyanate groups per molecule, with a blocking agent. Examples of blocking agents include oxime, phenol, alcohols, lactam, mercaptan, etc.

Examples of the above-mentioned polyisocyanate compounds having at least two isocyanate groups per molecule include hexamethylene diisocyanate, trimethylhexane diisocyanate, dimeryl diisocyanate, lysine diisocyanate, and like aliphatic diisocyanates; hydrogenated xylylene diisocyanate, cyclohexylene diisocyanate, isophorone diisocyanate, and like alicyclic diisocyanates; tolylene diisocyanate, phenylene diisocyanate 4,4'-diphenylmethane diisocyanate, xylylene diisocyanate, tetramethylxylylene diisocyanate, naphthalene diisocyanate, and like aromatic diisocyanates; 2-isocyanatoethyl-2,6-diisocyanatocaproate, 3-isocyanatomethyl-1,6-hexamethylene diisocyanate, 4-isocyanatomethyl-1,8-octamethylene idisocyanate (commonly known as triaminononane triisocyanate) and like tri- or higher organic polyisocyanate compounds; dimers or trimers of these polyisocyanate compounds; prepolymers obtained by the urethanation reaction between such a polyisocyanate compound and a polyhydric alcohol, low-molecular weight polyester resin or water under conditions with excess isocyanate groups, etc.

Examples of usable carbodiimide-containing compounds include those obtained by subjecting isocyanate groups of a polyisocyanate compound to a carbon dioxide removal reaction. Commercially available carbodiimide-containing compounds are usable as the carbodiimide-containing compounds. Examples include "Carbodilite V-02", "Carbodilite V-02-L2", "Carbodilite V-04", "Carbodilite E-01", and "Carbodilite E-02" (tradenames, Nisshinbo Industries, Inc.); and the like.

When the aqueous coating composition of the present invention contains the above-mentioned curing agent (A2), the amounts of the above-mentioned film-forming aqueous resin (A1) and the above-mentioned curing agent (A2) contained are as follows, based on the total mass of the two components, from the perspective of improving the smoothness and water resistance of the coated film: the former is preferably about 30 to about 95 mass %, more preferably about 50 to about 90 mass %, and even more preferably about 60 to about 80 mass %; and the latter is preferably about 5 to about 70 mass %, more preferably about 10 to about 50 mass %, and even more preferably about 20 to about 40 mass %.

When the aqueous coating composition of the present invention contains the core-shell-type water-dispersible hydroxy-containing acrylic resin (A1-1'), the amount of the hydroxy-containing acrylic resin (A1-1') added is preferably about 2 to about 70 mass %, more preferably about 10 to about 55 mass %, and even more preferably about 20 to about 45 mass %, based on the total mass of the film-forming aqueous resin (A1).

When the aqueous coating composition of the present invention contains the hydroxy-containing polyester resin (A1-2), the amount of the hydroxy-containing polyester resin (A1-2) contained is preferably about 2 to about 70 mass %, more preferably about 10 to about 55 mass %, and even more preferably about 20 to about 45 mass %, based on the mass of the film-forming aqueous resin (A1).

Dioxazine Pigment (B)

Specific examples of dioxazine pigments include Color Index (C.I.) Pigment Violet 23 (C.I. No. 51319), C.I. Pigment Violet 37 (C.I. No. 51345), C.I. Pigment Blue 80, etc. Among them, in view of the hue and saturation of the obtained coated film, C.I. Pigment Violet 23 (C.I. No. 51319) is preferable.

Commercially available products can be used as the dioxazine-based pigment (B). Examples of commercially available products include "Hostaperm Violet RL Special" (tradename, Clariant), etc.

Hydrophobic Solvent (C)

In the present invention, the hydrophobic solvent (C) is an organic solvent, the mass of which that dissolves in 100 g of water at 20° C. is about 10 g or less. In particular, an organic solvent, the mass of which that dissolves in 100 g of water at 20° C. is about 0.001 to about 5 g, preferably about 0.01 to about 1 g, is desirable as the hydrophobic solvent (C). Generation of popping during heating and curing of the coated film can be suppressed by using the hydrophobic solvent (C).

Specific examples of the hydrophobic solvent (C) include hydrocarbon solvents such as gasoline, mineral spirits, toluene, xylene, solvent naphtha, etc.; alcohol solvents such as n-hexanol, n-octanol, 2-octanol, 2-ethylhexanol, n-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether, propylene glycol monophenyl ether, etc.; ester solvents such as n-butyl acetate, isobutyl acetate, isoamyl acetate, methylamyl acetate, ethylene glycol acetate monobutyl ether, etc.; and ketone solvents such as methyl isobutyl ketone, cyclohexanone, ethyl n-amyl ketone, diisobutyl ketone, etc. Such solvents can be used singly or in a combination of two or more.

To suppress popping in the obtained coated film and provide excellent smoothness and flip-flop property, a hydrophobic alcohol solvent is preferably used as the hydrophobic solvent (C). Among such solvents, $C_{7-14}$ hydrophobic alcohol solvents are preferable, and it is more preferable to use at least one hydrophobic solvent selected from the group consisting of 1-octanol, 2-octanol, 2-ethyl-1-hexanol, ethylene glycol mono-2-ethylhexyl ether, propylene glycol mono-n-butyl ether, and dipropylene glycol mono-n-butyl ether, among which 2-ethyl-1-hexanol or ethylene glycol mono-2-ethylhexyl ether is more preferable.

Resin (D) Having an Aromatic Ring with a Nitro Group Bonded Thereto

Preferably usable as the resin (D) having an aromatic ring with a nitro group bonded thereto are specifically acrylic resins having an aromatic ring with a nitro group bonded thereto. The acrylic resin having an aromatic ring with a nitro group bonded thereto can be obtained, for example, by (co)polymerization of a polymerizable unsaturated monomer having an aromatic ring with a nitro group bonded thereto and other polymerizable unsaturated monomers.

Among them, it is preferable that the above-mentioned resin (D) having an aromatic ring with a nitro group bonded thereto is a copolymer that can be obtained by copolymerizing monomer components comprising a polymerizable unsaturated monomer (a) represented by Formula (1) below Formula 3

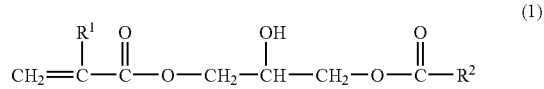

(wherein $R^1$ represents a hydrogen atom or a methyl group; and $R^2$ represents an aromatic ring having a nitro group bonded thereto) and other polymerizable unsaturated monomer (b), to achieve excellent luster of the obtained coated film.

Examples of $R^2$ in Formula (1) above include 2-nitrophenyl group, 3-nitrophenyl group, 4-nitrophenyl group, 2-hydroxy-4-nitrophenyl group, 2-methyl-4-nitrophenyl group, 3,5-dinitrophenyl group, etc. Among them, 2-nitrophenyl group, 3-nitrophenyl group or 4-nitrophenyl group is preferable, and 4-nitrophenyl group is even more preferable.

Polymerizable Unsaturated Monomer (a)

The polymerizable unsaturated monomer (a) is not particularly limited as long as it is a polymerizable unsaturated monomer represented by Formula (1) above.

The above-mentioned polymerizable unsaturated monomer (a) can be obtained, for example, by reacting glycidyl (meth)acrylate and an aromatic carboxylic acid having a nitro group. Usable examples of the aromatic carboxylic acid having a nitro group include 2-nitrobenzoic acid, 3-nitrobenzoic acid, 4-nitrobenzoic acid, 2-hydroxy-4-nitrobenzoic acid, 2-methyl-4-nitrobenzoic acid, 3,5-dinitrobenzoic acid, etc.

The reaction between glycidyl(meth)acrylate and an aromatic carboxylic acid having a nitro group can be carried out, for example, by heating them in the presence of a tertiary amine and/or a quaternary ammonium salt at about 90 to about 160° C. for about 2 to about 10 hours.

Examples of usable tertiary amines mentioned above include tributylamine, N,N-dimethylbenzylamine, 2-(dimethylamino) ethanol, N-methyldiethanolamine, triethanolamine, etc. Examples of the above-mentioned usable quaternary ammonium salt include triethylbenzylammonium chloride, tetramethylammonium chloride, tetraethylammonium chloride, tetra-n-butylammonium chloride, tetraethylammonium bromide, tetra-n-butylammonium bromide, tetra-n-butylammonium iodide, etc.

Preferably used as the polymerizable unsaturated monomer (a) are polymerizable unsaturated monomers represented by Formula (2) shown below Formula 4

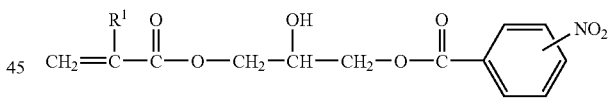

(wherein $R^1$ represents a hydrogen atom or a methyl group), among which a polymerizable unsaturated monomer represented by Formula (3) shown below Formula 5

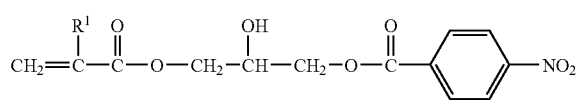

(wherein $R^1$ represents a hydrogen atom or a methyl group) is more preferably used.

Usually, the polymerizable unsaturated monomer represented by Formula (2) shown above can be obtained by allowing glycidyl(meth)acrylate and either one of 2-nitrobenzoic acid, 3-nitrobenzoic acid and 4-nitrobenzoic acid. The polymerizable unsaturated monomer represented by Formula (3)

shown above can be normally obtained by reacting glycidyl (meth)acrylate and 4-nitrobenzoic acid.

Other Polymerizable Unsaturated Monomer (b)

Other polymerizable unsaturated monomer (b) is a polymerizable unsaturated monomer other than the monomer (a) that can be copolymerized with the above-mentioned polymerizable unsaturated monomer (a). Specific examples of the monomer are listed as (i) to (xx). These can be used singly or in a combination of two or more.

(i) Alkyl or cycloalkyl(meth)acrylates: for example, methyl (meth)acrylate, ethyl(meth)acrylate, n-propyl(meth)acrylate, i-propyl(meth)acrylate, n-butyl(meth)acrylate, i-butyl(meth)acrylate, tert-butyl(meth)acrylate, n-hexyl(meth)acrylate, n-octyl(meth)acrylate, 2-ethylhexyl(meth)acrylate, nonyl (meth)acrylate, tridecyl(meth)acrylate, lauryl(meth)acrylate, stearyl(meth)acrylate, "Isostearyl Acrylate" (tradenames, Osaka Organic Chemical Industry, Ltd.), cyclohexyl(meth)acrylate, methylcyclohexyl(meth)acrylate, t-butylcyclohexyl (meth)acrylate, cyclododecyl(meth)acrylate, tricyclodecanyl (meth)acrylate, etc.

(ii) Isobornyl-containing polymerizable unsaturated monomers: isobornyl(meth)acrylate, etc.

(iii) Adamantyl-containing polymerizable unsaturated monomers: adamantyl(meth)acrylate, etc.

(iv) Tricyclodecenyl-containing polymerizable unsaturated monomers: tricyclodecenyl(meth)acrylate, etc.

(v) Aromatic ring-containing polymerizable unsaturated monomers: styrene, a-methylstyrene, vinyltoluene, benzyl (meth)acrylate, etc.

(vi) Alkoxysilyl-containing polymerizable unsaturated monomers: vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane, etc.

(vii) Fluorinated alkyl-containing polymerizable unsaturated monomers: perfluorobutylethyl(meth)acrylate, perfluorooctylethyl(meth)acrylate, and like perfluoroalkyl(meth)acrylates; fluoroolefins; etc.

(viii) Polymerizable unsaturated monomers having photopolymerizable functional groups such as a maleimide group: tetrahydrophthalmaleimide(meth)acrylate, etc.

(ix) Vinyl compounds: N-vinylpyrrolidone, ethylene, butadiene, chloroprene, vinyl propionate, vinyl acetate, etc.

(x) Hydroxy-containing polymerizable unsaturated monomers: 2-hydroxyethyl (meth)acrylate, 2-hydroxypropyl (meth)acrylate, 3-hydroxypropyl(meth)acrylate, 4-hydroxybutyl(meth)acrylate, and like monoesterified products of (meth)acrylic acid with a dihydric alcohol containing 2 to 8 carbon atoms, e-caprolactone-modified products of the monoesterified products, N-hydroxymethyl (meth)acrylamide, allyl alcohol, and (meth)acrylate having a polyoxyethylene chain with a terminal hydroxyl group.

(xi) Carboxy-containing polymerizable unsaturated monomers: (meth)acrylic acid, maleic acid, crotonic acid, β-carboxyethyl acrylate, etc.

(xii) Nitrogen-containing polymerizable unsaturated monomers other than the above-mentioned polymerizable unsaturated monomer (a): (meth)acrylonitrile, (meth)acrylamide, N,N-dimethylaminoethyl(meth)acrylate, N,N-diethylaminoethyl(meth)acrylate, N,N-dimethylaminopropyl(meth)acrylamide, methylene bis(meth)acrylamide, ethylene bis(meth)acrylamide, dimethylaminoethyl(meth)acrylate, adducts of glycidyl(meth)acrylate with amines, etc.

(xiii) Polymerizable unsaturated monomers having two or more polymerizable unsaturated groups per molecule: allyl (meth)acrylate, 1,6-hexanediol di(meth)acrylate, etc.

(xiv) Epoxy-containing polymerizable unsaturated monomers: glycidyl(meth)acrylate, β-methylglycidyl(meth)acrylate, 3,4-epoxycyclohexylmethyl(meth)acrylate, 3,4-epoxycyclohexylethyl(meth)acrylate, 3,4-epoxycyclohexylpropyl (meth)acrylate, allyl glycidyl ether, etc.

(xv) (Meth)acrylates having alkoxy-terminated polyoxyethylene chains.

(xvi) Sulfonic acid group-containing polymerizable unsaturated monomers: 2-acrylamide-2-methylpropanesulfonic acid, 2-sulfoethyl(meth)acrylate, allylsulfonic acid, 4-styrenesulfonic acid, etc.; sodium salts and ammonium salts of such sulfonic acids; etc.

(xvii) Phosphoric acid group-containing polymerizable unsaturated monomers: acid phosphooxy ethyl(meth)acrylate, acid phosphooxypropyl(meth)acrylate, acid phosphooxypoly(oxyethylene)glycol(meth)acrylate, acid phosphooxypoly(oxyethylene)glycol(meth)acrylate, etc.

(xviii) Polymerizable unsaturated monomers having UV-absorbing functional groups: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole, etc.

(xix) UV-stable polymerizable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-chrotonoyl-4-crotonoyloxy-2,2,6,6-tetramethylpiperidine, etc.

(xx) Carbonyl-containing polymerizable unsaturated monomers: acrolein, diacetone acrylamide, diacetone methacrylamide, acetoacetoxylethyl methacrylate, formylstyrol, $C_{4-7}$ vinyl alkyl ketones (e.g., vinyl methyl ketone, vinyl ethyl ketone, vinyl butyl ketone), etc.

The other polymerizable unsaturated monomer (b) preferably contains, as at least part of the component, a polymerizable unsaturated monomer having a polyoxyalkylene chain to improve the storage stability of the coating composition.

The above-mentioned polymerizable unsaturated monomer having a polyoxyalkylene chain is a monomer containing a polyoxyalkylene chain and a polymerizable unsaturated group per molecule, and can impart hydrophilicity to the formed resin (D) mentioned above.

Examples of the above-mentioned polyoxyalkylene chain include a polyoxyethylene chain, a polyoxypropylene chain, a chain consisting of polyoxyethylene blocks and polyoxypropylene blocks, a chain of randomly bonded polyoxyethylene blocks and polyoxypropylene, etc. In general, these polyoxyalkylene chains preferably have a molecular weight ranging from about 200 to about 5,000, preferably about 500 to about 4,000, and even more preferably about 800 to about 3,000.

Typical examples of the above-mentioned polymerizable unsaturated monomer having a polyoxyalkylene chain include polymerizable unsaturated monomers represented by Formula (4) shown below.

Formula 6

(4)

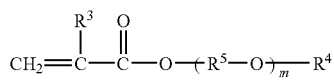

(wherein $R^3$ represents a hydrogen atom or a methyl group; $R^4$ represents a hydrogen atom or a $C_{1-4}$ alkyl group; $R^5$ represents a $C_{2-4}$ alkylene group; m represents an integer from 3 to 150, preferably 10 to 80, and even more preferably 25 to 50; and m oxyalkylene units ($R^5$—O) may be the same or different from each other). Specific examples of the polymerizable unsaturated monomer represented by Formula (4) shown above include tetraethylene glycol(meth)acrylate, methoxytetraethylene glycol(meth)acrylate, ethoxytetraethylene glycol(meth)acrylate, n-butoxytetraethylene glycol(meth)acrylate, tetrapropylene glycol(meth)acrylate, methoxytetrapropylene glycol(meth)acrylate, ethoxytetrapropylene glycol(meth)acrylate, n-butoxytetrapropylene glycol(meth)acrylate, polyethylene glycol(meth)acrylate, polypropylene glycol(meth)acrylate, methoxypolyethylene glycol(meth)acrylate, ethoxypolyethylene glycol(meth)acrylate, etc. These can be used singly or in a combination of two or more. Among them, polyethylene glycol(meth)acrylate, polypropylene glycol(meth)acrylate, methoxypolyethylene glycol(meth)acrylate and ethoxypolyethylene glycol(meth)acrylate are preferable, and methoxypolyethylene glycol(meth)acrylate and ethoxypolyethylene glycol(meth)acrylate are particularly preferable.

The molecular weight of the above-mentioned polymerizable unsaturated monomer having a polyoxyalkylene chain is preferably about 300 to about 6,000, more preferably about 600 to about 5,000, and even more preferably about 900 to about 3,500.

The amount of the above-mentioned polymerizable unsaturated monomer having a polyoxyalkylene chain used is preferably about 5 to about 50 mass %, more preferably about 10 to about 40 mass %, and even more preferably about 15 to 30 mass %, based on the total mass of the polymerizable unsaturated monomer (a) and the other polymerizable unsaturated monomer (b).

The other polymerizable unsaturated monomer (b) preferably contains, as at least part of the component, an aromatic ring-containing polymerizable unsaturated monomer, to improve the storage stability of the coating composition.

Specific examples of the aromatic ring-containing polymerizable unsaturated monomer are as listed in (v) above. It is preferable to use styrene as the aromatic ring-containing polymerizable unsaturated monomer.

The amount of the aromatic ring-containing polymerizable unsaturated monomer used is preferably about 1 to about 50 mass %, more preferably about 3 to about 40 mass %, and even more preferably about 5 to about 30 mass %, based on the total mass of the polymerizable unsaturated monomer (a) and the other polymerizable unsaturated monomer (b).

It is desirable that the resin (D) having an aromatic ring with a nitro group bonded thereto reacts with the curing agent (A2) such as an amino resin, a blocked or unblocked polyisocyanate compound, an oxazoline group-containing compound, and a carbodiimide-containing compound, and is incorporated into the cross-linked cured coated film in view of the performance of the coated film in, for example, water resistance. Therefore, the other polymerizable unsaturated monomer (b) preferably contains a hydroxy-containing polymerizable unsaturated monomer and/or a carboxy-containing polymerizable unsaturated monomer as at least part thereof, and even more preferably contains a hydroxy-containing polymerizable unsaturated monomer.

Specific examples of the hydroxy-containing polymerizable unsaturated monomer are as listed in (x) above. Preferably used hydroxy-containing polymerizable unsaturated monomers are 2-hydroxyethyl(meth)acrylate, 4-hydroxybutyl(meth)acrylate, e-caprolactone-modified products of 2-hydroxyethyl(meth)acrylate, etc. Among them, it is even more preferable to use 2-hydroxyethyl(meth)acrylate.

The hydroxy-containing polymerizable unsaturated monomer preferably has a hydroxy value of the obtained resin (D) having an aromatic ring with a nitro group bonded thereto of about 5 to about 180 mg KOH/g, more preferably about 20 to about 140 mg KOH/g, and even more preferably about 40 to about 100 mg KOH/g, to improve the water resistance of the formed coated film.

The amount of hydroxy-containing polymerizable unsaturated monomer used is preferably about 1 to about 40 mass %, more preferably about 3 to about 30 mass %, and even more preferably about 5 to about 20 mass %, based on the total mass of the polymerizable unsaturated monomer (a) and the other polymerizable unsaturated monomer (b).

The other polymerizable unsaturated monomer (b) can contain a carboxy-containing polymerizable unsaturated monomer as at least a part thereof.

Specific examples of the carboxy-containing polymerizable unsaturated monomer are as listed in (xi) above. It is particularly preferable to use (meth)acrylic acid, etc., as the carboxy-containing polymerizable unsaturated monomer.

When the carboxy-containing polymerizable unsaturated monomer is used as a part of the other polymerizable unsaturated monomer (b), the amount of the carboxy-containing polymerizable unsaturated monomer used is preferably about 1 to about 20 mass %, more preferably about 2 to about 15 mass %, and even more preferably about 3 to about 10 mass %, based on the total mass of the polymerizable unsaturated monomer (a) and the other polymerizable unsaturated monomer (b).

The other polymerizable unsaturated monomer (b) preferably contains a polymerizable unsaturated monomer having a $C_1$ or $C_2$ alkyl group as at least part thereof, to improve the storage stability of the coating composition.

Examples of the polymerizable unsaturated monomer having a $C_1$ or $C_2$ alkyl group include methyl(meth)acrylate and ethyl(meth)acrylate. These monomers can be used singly or in a combination of two or more.

Preferably used as the above-mentioned polymerizable unsaturated monomer having a $C_1$ or $C_2$ alkyl group is methyl methacrylate, in order to improve the storage stability of the coating composition.

The amount of the above-mentioned polymerizable unsaturated monomer having a $C_1$ or $C_2$ alkyl group used is preferably about 5 to about 70 mass %, more preferably about 10 to about 60 mass %, and even more preferably about 15 to about 50 mass %, based on the total mass of the polymerizable unsaturated monomer (a) and the other polymerizable unsaturated monomer (b).

The resin (D) having an aromatic ring with a nitro group bonded thereto can be obtained, for example, by copolymerization of the polymerizable unsaturated monomer (a) and the other polymerizable unsaturated monomer (b). The amounts of the polymerizable unsaturated monomer (a) and the other polymerizable unsaturated monomer (b) used in the copolymerization are such that the mass ratio of the polymerizable unsaturated monomer (a)/the other polymerizable unsaturated monomer (b) is preferably about 5/95 to about 60/40, more preferably about 10/90 to about 40/60, and even more preferably about 15/85 to about 30/70, to improve the storage stability of the coating composition.

The above-mentioned copolymerization of the polymerizable unsaturated monomer (a) and the other polymerizable unsaturated monomer (b) can be performed, for example, by using a known method, such as solution polymerization in an organic solvent or a mixed solution of an organic solvent and water, or emulsion polymerization in a water medium. Among these, solution polymerization is preferable.

When employed, solution polymerization can be carried out, for example, by dissolving or dispersing the polymerizable unsaturated monomer (a), the other polymerizable unsaturated monomer (b) and a radical polymerization initiator in an organic solvent, or a mixed solution of an organic solvent-water prepared by dissolving water in an organic solvent, and then heating the solution or dispersion normally at a temperature of about 80 to about 180° C. for about 2 to about 10 hours with stirring to perform copolymerization.

Examples of organic solvents that can be used in the above-mentioned copolymerization reaction include heptane, toluene, xylene, octane, mineral spirits and like hydrocarbon solvents; ethyl acetate, n-butyl acetate, isobutyl acetate, ethylene glycol monomethyl ether acetate, diethylene glycol monobutyl ether acetate and like ester solvents; methyl ethyl ketone, methyl isobutyl ketone, diisobutyl ketone, cyclohexanone and like ketone solvents; methanol, ethanol, isopropanol, n-butanol, sec-butanol, isobutanol and like alcohol solvents; n-butyl ether, dioxane, ethylene glycol monomethyl ether, ethylene glycol monobutyl ether, propylene glycol monomethyl ether, propylene glycol monopropyl ether, propylene glycol monobutyl ether, dipropylene glycol monomethyl ether, dipropylene glycol monobutyl ether, tripropylene glycol monomethyl ether and like ether solvents; N,N-dimethylacetamide, N,N-dimethylformamide, N-methyl-2-pyrrolidone, N,N-dimethyl-β-methoxy propionamide and like amide solvents; 1,3-dimethyl-2-imidazolidinone and like urea solvents; dimethyl sulfoxide and like sulfoxide solvents; tetramethylene sulfone and like sulfone solvents; "Swazol 310", "Swazol 1000", "Swazol 1500" (tradenames, Maruzen Petrochemical) and like aromatic petroleum solvents, etc. These organic solvents can be used singly or in a combination of two or more. Usually, the amount of the organic solvent used in the solution polymerization is preferably about 20 to about 400 mass parts, per 100 mass parts of the total amount of the monomers (a) and (b).

Examples of the radical polymerization initiator include cyclohexanone peroxide, 3,3,5-trimethylcyclohexanone peroxide, methylcyclohexanone peroxide and like ketone peroxides; 1,1-bis(tert-butylperoxy)-3,3,5-trimethyl cyclohexane, 1,1-bis(tert-butylperoxy)cyclohexane, n-butyl-4,4-bis(tert-butylperoxy)valerate and like peroxy ketals; cumene hydroperoxide, 2,5-dimethylhexane-2,5-dihydroperoxide and like hydroperoxides; 1,3-bis(tert-butylperoxy-m-isopropyl)benzene, 2,5-dimethyl-2,5-di(tert-butylperoxy)hexane, diisopropylbenzene peroxide, tert-butyl cumyl peroxide and like dialkyl peroxides; decanoyl peroxide, lauroyl peroxide, benzoyl peroxide, 2,4-dichlorobenzoyl peroxide and like diacyl peroxides; bis(tert-butylcyclohexyl)peroxy dicarbonate and like peroxy carbonates; organic peroxide polymerization initiators such as tert-butyl peroxybenzoate, 2,5-dimethyl-2,5-di(benzoylperoxy)hexane and like peroxyesters; 2,2'-azobisisobutyronitrile, 2,2'-azobis(2-methyl methyl propanoate), 1,1-azobis(cyclohexane-1-carbonitrile), azocumene 2,2'-azobismethylvaleronitrile, 4,4'-azobis(4-cyanovaleric acid) and like azo polymerization initiators. While the amounts of these radical polymerization initiators used are not particularly limited, they are normally preferably about 0.1 to about 15 mass parts, and more preferably about 0.3 to about 10 mass parts, per 100 mass parts of the total mass of the monomers (a) and (b).

The method of adding the monomeric components or polymerization initiator in the above polymerization reaction is subject to no particular limitation, but from the viewpoints of temperature control during the polymerization reaction and suppression of occurrence of a poorly cross-linked product, such as a gelated product, it is preferable to add the polymerization initiator dropwise, as divided into plural portions over from the initial stage of polymerization to the late stage, rather than feeding it all at once in the initial stage of the polymerization. An example of the method for preparing the resin (D) having an aromatic ring with a nitro group bonded thereto is as follows: the glycidyl-containing polymerizable unsaturated monomer and the other polymerizable unsaturated monomer are copolymerized by the solution polymerization as mentioned above to obtain a copolymer, and the glycidyl groups in the copolymer and the aromatic carboxylic acid having a nitro group are then reacted in the presence of a tertiary amine and/or a quaternary ammonium salt at about 90 to about 160° C. for about 2 to about 10 hours.

The thus-obtained resin (D) having an aromatic ring with a nitro group bonded thereto preferably has a hydroxy value of about 5 to about 180 mg KOH/g, more preferably about 20 to about 140 mg KOH/g, and even more preferably about 40 to about 100 mg KOH/g. The acid value of the resin (D) is preferably about 0 to about 150 mg KOH/g, more preferably about 0 to about 120 mg KOH/g, and even more preferably about 0 to about 80 mg KOH/g. The weight average molecular weight of the resin (D) is preferably about 3,000 to about 500,000, more preferably about 5,000 to 200,000, and even more preferably about 10,000 to about 100,000.

Aqueous Coating Composition

The aqueous coating composition of the present invention contains the film-forming aqueous resin (A1), the dioxazine pigment (B), the hydrophobic solvent (C) and the resin (D) having an aromatic ring with a nitro group bonded thereto described above. The amounts of the above-mentioned film-forming aqueous resin (A1), the dioxazine pigment (B), the hydrophobic solvent (C) and the resin (D) having an aromatic ring with a nitro group bonded thereto contained preferably fall within the range described below, in view of the storage stability and suppression of popping.

Dioxazine pigment (B): about 0.01 to about 15 mass parts, preferably about 0.05 to about 10 mass parts, and even more preferably about 0.1 to about 5 mass parts, based on 100 mass parts of the film-forming aqueous resin (A1), Hydrophobic solvent (C): about 10 to about 120 mass parts, preferably about 20 to about 90 mass parts, and even more preferably about 30 to about 70 mass parts, based on 100 mass parts of the film-forming aqueous resin (A1).

Resin (D) having an aromatic ring with a nitro group bonded thereto: about 20 to about 300 mass parts, preferably about 30 to about 200 mass parts, and even more preferably about 40 to about 100 mass parts, based on 100 mass parts of the dioxazine pigment (B).

It is unclear why the aqueous coating composition of the present invention has excellent storage stability, but the following is assumed: In conventional aqueous coating compositions, the dioxazine pigment (B) having a surface with relatively high hydrophobicity migrates into the hydrophobic solvent (C) and agglomerates during storage of the coating composition, and therefore the dispersed state of the dioxazine pigment (B) is altered and a change in color due to storage occurs. In contrast, in the aqueous coating composition of the present invention, the resin (D) having an aromatic ring with a nitro group bonded thereto strongly adsorbs onto the dioxazine pigment (B), which prevents the resin (D) from being mixed with the hydrophobic solvent (C). Therefore, migration of the dioxazine pigment (B) into the hydrophobic solvent (C) is suppressed, and the dispersed state of the pigment (B) is not altered, whereby a change in color due to storage is unlikely to occur.

If necessary, the aqueous coating composition of the present invention may contain additives for coating compositions, such as effect pigments, coloring pigments other than the dioxazine pigment (B), extender pigments, thickening agents, curing catalysts, UV absorbers, light stabilizers, antifoaming agents, plasticizers, organic solvents other than the above hydrophobic solvents (C), surface control agents, anti-settling agents, etc.

The above-mentioned effect pigment is a pigment which imparts brilliant luster and iridescence to coated films. Specific examples include aluminum (including evaporated aluminum), copper, zinc, brass, nickel, aluminum oxide, mica, mica coated with titanium oxide or iron oxide, aluminum oxide coated with titanium oxide or iron oxide, etc. Among these, aluminum, mica, mica coated with titanium oxide or iron oxide, and aluminum oxide coated with titanium oxide and iron oxide are preferable, and aluminum is even more preferable. Such pigments can be used singly or in a combination of two or more. These pigments preferably have a scale-like shape.

Preferably used scaly effect pigments have a length in the longitudinal direction of about 1 to about 100 µm, preferably about 5 to about 40 µm, and a thickness of about 0.001 to about 5 µm, preferably about 0.01 to about 2 µm.

When the aqueous coating composition of the present invention contains the above-mentioned effect pigment, the amount of the effect pigment is preferably about 1 to about 50 mass parts, more preferably about 5 to about 40 mass parts, and even more preferably about 10 to about 30 mass parts, based on 100 mass parts of the film-forming aqueous resin (A1).

The aqueous coating composition of the present invention may further contain a phosphoric acid group-containing resin as a resin component, in addition to the above-mentioned film-forming aqueous resin (A1) and the above-mentioned resin (D). In particular, when the aqueous coating composition of the present invention contains the above-mentioned effect pigment, especially an aluminum pigment, it is preferable that the aqueous coating composition of the present invention contains the phosphoric acid group-containing resin, in view of the smoothness, luster, metallic mottling, and water resistance of the obtained coated film.

The above-mentioned phosphoric acid group-containing resin can be produced, for example, by copolymerizing the phosphoric acid group-containing polymerizable unsaturated monomer and the other polymerizable unsaturated monomer by solution polymerization or other known methods. Examples of the above-mentioned phosphoric acid group-containing polymerizable unsaturated monomer include acid phosphoxyethyl(meth)acrylate, acid phosphoxypropyl (meth)acrylate, reaction products of glycidyl(meth)acrylate and alkyl phosphoric acid, etc. These can be used singly or in a combination of two or more.

In the above-mentioned phosphoric acid group-containing resin, the mass ratio of the above-mentioned phosphoric acid group-containing polymerizable unsaturated monomer to the other polymerizable unsaturated monomer in their copolymerization is preferably about 1/99 to about 40/60, more preferably about 5/95 to about 35/65, and even more preferably about 10/90 to about 30/70.

When the aqueous coating composition of the present invention contains the above-mentioned phosphoric acid group-containing resin, the amount of the phosphoric acid group-containing resin contained is preferably about 0.5 to about 15 mass parts, more preferably about 0.75 to about 10 mass parts, and even more preferably about 1 to about 5 mass parts, per 100 mass parts of the film-forming aqueous resin (A1).

Examples of coloring pigments other than the dioxazine pigment (B) include titanium oxide; zinc white; carbon black; molybdenum red; Prussian blue; cobalt blue; Permanent Red, Disazo Yellow and like azo pigments; Phthalocyanine Blue, Phthalocyanine Green and like phthalocyanine pigments; Quinacridone Red, Quinacridone Violet and like quinacridone pigments; Isoindoline Yellow, Isoindoline Orange and like isoindoline pigments; Anthrapyrimidine Yellow, Dianthraquinonyl Red, Indanthrone Blue and like threne pigments; Perylene Red, Perylene Maroon and like perylene pigments; DPP Red and like diketopyrrolopyrrole pigments, etc. Examples of extender pigments include talc, clay, kaolin, baryta, barium sulfate, barium carbonate, calcium carbonate, silica, alumina white, etc.

Examples of thickening agents include inorganic thickening agents such as silicate, metal silicate, montmorillonite, colloidal alumina, etc.; polyacrylic acid thickening agents such as copolymers of (meth)acrylic acid and (meth)acrylic ester, sodium polyacrylate, etc.; associative thickening agents having a hydrophilic moiety and a hydrophobic moiety per molecule and capable of effectively increasing the viscosity in an aqueous medium by adsorption of the hydrophobic moiety on the surface of pigments or emulsion particles in a coating composition or by association between hydrophobic moieties; cellulose derivative thickening agents such as carboxymethylcellulose, methylcellulose, hydroxyethylcellulose, etc.; protein thickening agents such as casein, sodium caseinate, ammonium caseinate, etc.; alginate thickening agents such as sodium alginate, etc.; polyvinyl thickening agents such as polyvinyl alcohol, polyvinylpyrrolidone, polyvinyl benzyl ether copolymers, etc.; polyether thickening agents such as polyether dialkyl ester, polyether dialkyl ether, polyether epoxy-modified products, etc.; maleic anhydride copolymer thickening agents such as partial esters of a copolymer of vinyl methyl ether and maleic anhydride, etc.; polyamide thickening agents such as polyamide amine salts, etc.; and the like. Such thickening agents can be used singly or in a combination of two or more. Among these, polyacrylic acid thickening agents and/or associative thickening agents are preferably used.

Examples of usable polyacrylic acid thickening agents include commercially available products, which are available, for example, under the tradenames "PRIMAL ASE-60", "PRIMAL TT-615", and "PRIMAL RM-5" (manufactured by Rohm and Haas); "SN thickener 613", "SN thickener 618", "SN thickener 630", "SN thickener 634", and "SN thickener 636" (manufactured by San Nopco Ltd.); and the like.

Examples of usable associative thickening agents include commercially available products such as "UH-420", "UH-450", "UH-462", "UH-472", "UH-540", "UH-752", "UH-756VF", and "UH-814N", (tradenames, manufactured by ADEKA Co. Ltd.); "PRIMAL RM-8W", "PRIMAL RM-825", "PRIMAL RM-2020NPR", "PRIMAL RM-12W", and "PRIMAL SCT-275", (tradenames, manufactured by Rohm and Haas); "SN thickener 612", "SN thickener 621N", "SN thickener 625N", "SN thickener 627N", and "SN thickener 660T", (tradenames, manufactured by San Nopco Ltd.); and the like.

When the aqueous coating composition of the invention comprises a thickening agent as described above, the proportion thereof is preferably about 0.01 to about 10 mass parts, more preferably about 0.05 to about 3 mass parts, and still more preferably about 0.1 to about 2 mass parts, per 100 mass parts of the film-forming aqueous reins (A1).

Preparation of Aqueous Coating Composition

The aqueous base coating composition of the invention can be prepared by mixing and dispersing, in an aqueous medium, the film-forming aqueous resin (A1), the dioxazine pigment (B), hydrophobic solvent (C), and the resin having an aromatic ring with a nitro group bonded thereto (D), together with, if necessary, other additives for coating compositions, using a known method.

Examples of usable aqueous media include deionized water and mixtures of deionized water and hydrophilic organic solvents. Examples of usable hydrophilic organic solvents include propylene glycol monomethyl ether, ethylene glycol mono-n-butyl ether, etc.

In the above-mentioned mixing, it is preferable that the dioxazine pigment (B) and the resin (D) having an aromatic ring with a nitro group bonded thereto are mixed beforehand to prepare a pigment dispersion, and the pigment dispersion is mixed and dispersed in the aqueous medium together with the film-forming aqueous resin (A1), the hydrophobic solvent (C), etc.

It is usually preferable that the solids content of the aqueous coating composition of the invention be about 5 to about 50 mass %, more preferably about 15 to about 40 mass %, and still more preferably about 20 to about 30 mass %.

Method for Forming a Coated Film

The coating composition of the invention is applied to various substrates to form a coated film with an excellent appearance.

Substrate

The substrate to be coated with the coating composition of the invention is not particularly limited. Examples of substrates include exterior panel parts of automotive bodies such as passenger cars, trucks, motorcycles, buses, etc.; automotive components; exterior panel parts of household electric appliances such as cellular phones, audiovisual apparatus, etc.; and the like. Among these, exterior panel parts of automotive bodies and automotive components are especially preferable.

Materials for these substrates are not particularly limited. Examples thereof include metallic materials such as iron, aluminum, brass, copper, tin plate, stainless steel, galvanized steel, steels plated with zinc alloy (Zn—Al, Zn—Ni, Zn—Fe, etc.); plastic materials such as polyethylene resin, polypropylene resin, acrylonitrile-butadiene-styrene (ABS) resin, polyamide resin, acryl resin, vinylidene chloride resin, polycarbonate resin, polyurethane resin, epoxy resin, and like resins, various kinds of FRP, etc.; inorganic materials such as glass, cement, concrete, etc.; wood; textile materials (paper, cloth, etc.); and the like. Among these, metallic materials and plastic materials are especially preferable.

The above substrates may be outer panels of automobile bodies, household electric appliances, steel plates used as a component of such outer panels or electric appliances, and like metal substrates whose metal surfaces have been treated with phosphate, chromate, composite oxide, or the like, and may further have a coating film formed thereon.

Examples of such substrates having a coating film formed thereon include those produced by surface-treating substrates, where necessary, and forming an undercoat thereon; and those produced by further forming an intermediate coat on the undercoat.

Coating Method

A desired coated film can be formed by applying the coating composition of the present invention onto a substrate to form a wet coated film (uncured coated film), and then curing the wet coated film.

The method of applying the coating composition of the invention is not particularly limited. For example, air spray coating, airless spray coating, rotary atomization coating, curtain coating, and like application methods can be used. A wet coated film can be formed by such methods. Among these, air spray coating, rotary atomization coating, and the like are especially preferable. Upon application of the coating composition, an electrostatic charge may be applied, if necessary.

Usually, the coating composition of the invention is preferably applied to a film thickness of about 5 to about 50 μm (when cured), more preferably about 5 to about 35 μm (when cured), and still more preferably about 8 to about 25 μm (when cured).

The wet coating can be cured by heating after application of the coating composition of the invention to a substrate. Heating can be performed by known heating means. For example, drying furnaces such as hot air furnaces, electric furnaces, infrared induction heating furnaces and the like can be used. The heating temperature is preferably about 80 to about 180° C., more preferably about 100 to about 170° C., and still more preferably about 120 to about 160° C. The heating time is not particularly limited, and is preferably about 10 to about 60 minutes, and more preferably about 20 to about 40 minutes.

In order to prevent coating defects such as popping on the coated surface, after application of the coating composition of the invention, it is preferable to perform preheating, air blowing, etc., prior to heat-curing, under conditions in which the coating does not substantially cure. The preheating temperature is preferably about 40 to about 100° C., more preferably about 50 to about 90° C., and still more preferably about 60 to about 80° C. The preheating time is preferably about 30 seconds to about 15 minutes, more preferably about 1 to about 10 minutes, and still more preferably about 2 to about 5 minutes. Air blowing can be usually performed by blowing room temperature air or air heated to about 25 to about 80° C. over the coated surface of the substrate for about 30 seconds to about 15 minutes.

When a multilayer coated film comprising a base coating and a clear coating is formed on a substrate such as an automotive body by a two-coat one-bake method, the coating composition of the invention can be advantageously used to form a base coating. The formation of a coated film in this case can be performed in accordance with the following Method I.

Method I

A method for forming a multilayer coated film comprising:
(1) a step of applying the aqueous coating composition of the invention to a substrate to form a base coating;
(2) a step of applying a clear coating composition to the uncured base coating surface to form a clear coating; and
(3) a step of heating the uncured base coating and the uncured clear coating to cure both coatings at the same time.

Preferable examples of the substrate in Method I include automobile body or like substrates that have an undercoat and/or an intermediate coat formed thereon. The "uncured coating" encompasses a set-to-touch coating and a dry-to-touch coating.

When the aqueous coating composition of the invention is applied by the above two-coat one-bake Method I, the composition is preferably applied to a film thickness of about 5 to about 40 μm (when cured), more preferably about 10 to about 30 μm (when cured), and still more preferably about 10 to about 20 μm (when cured). The above clear coating composition is preferably applied to a film thickness of about 10 to about 80 μm (when cured), and more preferably about 15 to about 60 μm (when cured).

In Method I, after application of the aqueous coating composition of the invention, in order to prevent coating defects such as popping on the coated surface, it is preferable to perform preheating, air blowing, etc., under conditions in which the coating does not substantially cure. The preheating temperature is preferably about 40 to about 100° C., more preferably about 50 to about 90° C., and still more preferably about 60 to about 80° C. The preheating time is preferably about 30 seconds to about 15 minutes, more preferably about 1 to about 10 minutes, and still more preferably about 2 to about 5 minutes. Air blowing can be usually performed by blowing room temperature air or air heated to about 25 to about 80° C. over the coated surface of the substrate for about 30 seconds to about 15 minutes.

After application of the clear coating composition, if necessary, it is possible to have an interval of about 1 to about 60 minutes at room temperature, or perform preheating at about 40 to about 80° C. for about 1 to about 60 minutes.

The above aqueous coating composition of the invention and clear coating composition can be cured using any of the above-described known heating means. The heating temperature is preferably about 80 to about 180° C., more preferably about 100 to about 170° C., and still more preferably about 120 to about 160° C. The heating time is preferably about 10 to about 60 minutes, and more preferably about 20 to about 40 minutes. This heating enables simultaneous curing of both coatings, i.e., a base coating and a clear coating.

When a multilayer coated film comprising an intermediate coating, a base coating, and a clear coating is formed on a substrate such as an automotive body by a three-coat one-bake method, the aqueous coating composition of the invention can be used to form the base coating. The formation of a coated film in this case can be performed in accordance with the following Method II.

Method II

A method for forming a multilayer coated film comprising:
(1) a step of applying an intermediate coating composition to a substrate to form an intermediate coating;
(2) a step of applying the aqueous coating composition of the invention to the uncured intermediate coating surface to form a base coating;
(3) a step of applying a clear coating composition to the uncured base coating surface to form a clear coating; and
(4) a step of heating the uncured intermediate coating, the uncured metallic base coating, and the uncured clear coating to simultaneously cure the coatings.

The above Method II comprises performing Method I to form a coated film on an uncured intermediate coating. A preferable example of the substrate in Method II is an automotive body having an undercoat formed thereon. The above-mentioned undercoat film is preferably formed by an electrodeposition coating composition, and is even more preferably formed by a cationic electrodeposition coating composition.

Usually in Method II, the intermediate coating composition is preferably applied to a film thickness of about 10 about 60 μm (when cured), and more preferably about 20 to about 40 μm (when cured). The aqueous coating composition of the invention is preferably applied to a film thickness of about 5 to about 40 μm (when cured), more preferably about 10 to about 30 μm (when cured), and still more preferably about 10 to about 20 μm (when cured). Usually, the clear coating composition is preferably applied to a film thickness of about 10 to about 80 μm (when cured), and more preferably about 15 to about 60 μm (when cured).

In Method II, when an aqueous coating composition is used as an intermediate coating composition, preheating is preferably performed after application of the intermediate coating composition. The preheating temperature is preferably about room temperature to about 100° C., more preferably about 40 to about 90° C., and still more preferably about 60 to about 80° C. The preheating time is preferably about 30 seconds to about 15 minutes, more preferably about 1 to about 10 minutes, and still more preferably about 2 to about 5 minutes.

It is also preferable to perform preheating after application of the aqueous coating composition. The preheating temperature is preferably about room temperature to about 100° C., more preferably about 40 to about 90° C., and still more preferably about 60 to about 80° C. The preheating time is preferably about 30 seconds to about 15 minutes, more preferably about 1 to about 10 minutes, and still more preferably about 2 to about 5 minutes.

After application of the clear coating composition, if necessary, it is possible to have an interval of about 1 to about 60 minutes at room temperature, or perform preheating at about 40 to about 80° C. for about 1 to about 60 minutes.

The three coatings, i.e., the uncured intermediate coating, uncured base coating, and uncured clear coating, can be heat cured using any of the above-described known heating means. The heating temperature is preferably about 80 to about 180° C., more preferably about 100 to about 170° C., and still more preferably about 120 to about 160° C. The heating time is preferably about 10 to about 60 minutes, and more preferably about 20 to about 40 minutes. This heating enables simultaneous curing of the three coated films, i.e., the intermediate coating, base coating, and clear coating.

As the clear coating composition used in the above Methods I and II, any known thermosetting clear coating compositions for coating an automotive body and the like can be used. Examples thereof include organic-solvent thermosetting coating compositions, aqueous thermosetting coating compositions, powder thermosetting coating compositions, which comprise a crosslinking agent and a base resin having a crosslinkable functional group.

Examples of the cross-linkable functional groups contained in a base resin include carboxy, hydroxy, epoxy, silanol, and the like. Examples of the kind of base resins include acrylic resins, polyester resins, alkyd resins, urethane resins, epoxy resins, fluororesins, and the like. Examples of crosslinking agents include polyisocyanate compounds, blocked polyisocyanate compounds, melamine resins, urea resins, carboxy-containing compounds, carboxy-containing resins, epoxy-containing resins, epoxy-containing compounds, and the like.

The clear coating composition may be a one-pack coating composition, or a multi-pack coating composition such as a two-pack urethane resin coating composition.

If necessary, the clear coating composition may contain a coloring pigment, effect pigment, dye, etc., without impairing the transparency of the clear coating composition, and may also contain an extender pigment, UV absorber, light stabilizer, antifoaming agent, thickening agent, anticorrosive, surface control agent, etc.

Examples of preferable combinations of base resin/crosslinking agent for such a clear coating composition are carboxy-containing resin/epoxy-containing resin, hydroxy-containing resin/polyisocyanate compound, hydroxy-containing resin/blocked polyisocyanate compound, hydroxy-containing resin/melamine resin, and the like.

As an intermediate coating composition used in the above Method II, any known thermosetting intermediate coating compositions can be used. Examples of thermosetting coating compositions preferably used are those containing a cross-linking agent, coloring pigment, extender pigment, and base resin having a cross-linkable functional group.

Examples of cross-linkable functional groups contained in the base resin include carboxy, hydroxy, epoxy, and the like. Examples of the kind of base resins include acrylic resins, polyester resins, alkyd resins, urethane resins and the like. Examples of usable cross-linking agents include melamine resins, polyisocyanate compounds, blocked polyisocyanate compounds, and the like.

The intermediate coating composition may be an organic solvent-based coating composition, aqueous coating composition, or powder coating composition. Among these, an aqueous coating composition is especially preferable.

In the above Methods I and II, the intermediate coating composition and clear coating composition can be applied using known methods such as air spray coating, airless spray coating, rotary atomization coating, etc.

EXAMPLES

The present invention will be described in more detail below with reference to Preparation Examples, Examples and Comparative Examples. However, the present invention is not limited to the Examples. In these Examples, "parts" and "percent" are expressed on a mass basis, unless otherwise specified.

Preparation of Hydroxy-Containing Acrylic Resin (A1-1)

Preparation Example 1

128 parts of deionized water and 2 parts of "Adekaria Soap SR-1025 (tradename, Adeka, emulsifier, active ingredient: 25%) were placed into a reaction vessel equipped with a thermometer, thermostat, stirrer, reflux condenser, nitrogen inlet tube and dropper. The mixture was stirred and mixed under a nitrogen stream and heated to 80° C.

A 1% portion of the total amount of monomer emulsion for a core copolymer described below and 5.3 parts of a 6% aqueous solution of ammonium persulfate were then introduced into the reaction vessel and the mixture was maintained at 80° C. for 15 minutes. The remainder of the monomer emulsion for the core copolymer was then added dropwise into the reaction vessel maintained at the same temperature, over a period of 3 hours. After the completion of the addition, the mixture was aged for 1 hour. A monomer emulsion for a shell copolymer described below was added dropwise over 1 hour, and the mixture was aged for 1 hour. While 40 parts of a 5% aqueous solution of 2-(dimethylamino)ethanol was gradually added into the reaction vessel, the mixture was cooled to 30° C. The reaction mixture was filtrated through a nylon cloth with a mesh size of 100 and the filtrate was collected, producing an aqueous dispersion of a hydroxy-containing acrylic resin dispersion (A1-1-1) having an average particle diameter of 100 nm, a solids content of 30%. The resulting water-dispersible hydroxy-containing acrylic resin had an acid value of 33 mg KOH/g, and a hydroxy value of 25 mg KOH/g.

Monomer emulsion for the core copolymer: 40 parts of deionized water, 2.8 parts of "Adekaria Soap SR-1025", 2.1 parts of methylenebisacrylamide, 2.8 parts of styrene, 16.1 parts of methyl methacrylate, 28 parts of ethyl acrylate, and 21 parts of n-butyl acrylate were mixed and stirred, producing a monomer emulsion for the core copolymer.

Monomer emulsion for the shell copolymer: 17 parts of deionized water, 1.2 parts of "Adekaria Soap SR-1025", 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate were mixed and stirred, producing a monomer emulsion for the shell copolymer.

Preparation Examples 2 to 5

Water-dispersible hydroxy-containing acrylic resin dispersions (A1-1-2) to (A1-1-5) were obtained in a manner similar to that in Preparation Example 1 except that the starting materials and proportions thereof shown in Table 1 below were used.

Table 1 shows the starting material proportions (parts), solids content (%), acid values (mg KOH/g), and hydroxy values (mg KOH/g) of the aqueous dispersions of the water-dispersible hydroxy-containing acrylic resins (A1-1-1) to (A1-1-5).

In Table 1, methylene bisacrylamide and allyl methacrylate in the monomer emulsion for the core copolymer are polymerizable unsaturated monomers having two or more polymerizable unsaturated groups per molecule. Styrene and 2-ethylhexyl acrylate in the monomer emulsion for the shell copolymer are hydrophobic polymerizable unsaturated monomers.

TABLE 1

| | | Preparation Example | | | | |
|---|---|---|---|---|---|---|
| | | 1 | 2 | 3 | 4 | 5 |
| Name of water-dispersible hydroxy-containing acrylic resin | | A1-1-1 | A1-1-2 | A1-1-3 | A1-1-4 | A1-1-5 |
| Deionized water | | 128 | 128 | 128 | 128 | 128 |
| "Adekaria Soap SR-1025" | | 2 | 2 | 2 | 2 | 2 |
| 6% Aqueous solution of Ammonium persulfate | | 5.3 | 5.3 | 5.3 | 5.3 | 5.3 |
| Monomer emulsion for core | Deionized water | 40 | 40 | 40 | 40 | 40 |
| | "Adekaria Soap SR-1025" | 2.8 | 2.8 | 2.8 | 2.8 | 2.8 |
| | Methylene bisacrylamide | 2.1 | 2.1 | | | |

TABLE 1-continued

| | | Preparation Example | | | | |
|---|---|---|---|---|---|---|
| | | 1 | 2 | 3 | 4 | 5 |
| Monomer emulsion for shell | Allyl methacrylate | | | 2.1 | | 2.1 |
| | Acrylamide | | | | 2.1 | |
| | Styrere | 2.8 | 2.8 | 2.8 | 2.8 | 2.8 |
| | Methyl methacrylate | 16.1 | 16.1 | 16.1 | 16.1 | 16.1 |
| | Ethyl methacrylate | 28 | 28 | 28 | 28 | 28 |
| | n-Butyl acrylate | 21 | 21 | 21 | 21 | 21 |
| | Deionized water | 17 | 17 | 17 | 17 | 17 |
| | "Adekaria Soap SR-1025" | 1.2 | 1.2 | 1.2 | 1.2 | 1.2 |
| | Ammonium persulfate | 0.03 | 0.03 | 0.03 | 0.03 | 0.03 |
| | Styrene | 3 | | 3 | | |
| | 2-Ethylhexyl acrylate | | 3 | | 3 | |
| | 2-Hydroxyethyl acrylate | 5.1 | 5.1 | 5.1 | 5.1 | 5.1 |
| | Methacrylic acid | 5.1 | 5.1 | 5.1 | 5.1 | 5.1 |
| | Methyl methacrylate | 6 | 6 | 6 | 6 | 9 |
| | Ethyl acrylate | 1.8 | 1.8 | 1.8 | 1.8 | 1.8 |
| | n-Butyl acrylate | 9 | 9 | 9 | 9 | 9 |
| 5% Aqueous solution of 2-(dimethylamino)ethanol | | 40 | 40 | 40 | 40 | 40 |
| Solids content (%) | | 30 | 30 | 30 | 30 | 30 |
| Acid value (mg KOH/g) | | 33 | 33 | 33 | 33 | 33 |
| Hydroxy value (mg KOH/g) | | 25 | 25 | 25 | 25 | 25 |

Among the hydroxy-containing acrylic resins (A1-1-1) to (A1-1-5) in Table 1, the resins (A1-1-1) to (A1-1-3) correspond to the core-shell-type water-dispersible hydroxy-containing acrylic resins (A1-1').

Preparation Example 6

Thirty-five parts of propylene glycol monopropyl ether was placed into a reaction vessel equipped with a thermometer, thermostat, stirrer, reflux condenser, nitrogen inlet tube and dropper, and heated to 85° C. A mixture of 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether and 2.3 parts of 2,2'-azobis(2,4-dimethylvaleronitrile) was added dropwise over a period of 4 hours. After completion of the addition, the mixture was aged for 1 hour. A mixture of 10 parts of propylene glycol monopropyl ether and 1 part of 2,2'-azobis(2,4-dimethylvaleronitrile) was added dropwise over a period of 1 hour. After completion of the addition, the mixture was aged for 1 hour. Subsequently, 7.4 parts of diethanolamine was added, producing a hydroxy-containing acrylic resin solution (A1-1-6) with a solids content of 55%. The obtained hydroxy-containing acrylic resin had an acid value of 47 mg KOH/g, and a hydroxy value of 72 mg KOH/g.

Preparation of Hydroxy-Containing Polyester Resin (A1-2)

Preparation Example 7

109 parts of trimethylolpropane, 141 parts of 1,6-hexanediol, 126 parts of 1,2-cyclohexanedicarboxylic anhydride and 120 parts of adipic acid were placed in a reaction vessel equipped with a thermometer, thermostat, stirrer, reflux condenser and water separator. The mixture was heated from 160° C. to 230° C. over 3 hours, and subjected to a condensation reaction at 230° C. for 4 hours. Subsequently, to introduce a carboxyl group into the obtained condensation reaction product, 38.3 parts of trimellitic anhydride was added and the mixture was allowed to react at 170° C. for 30 minutes. The reaction mixture was then diluted with 2-ethyl-1-hexanol (the amount that dissolves in 100 g of water at 20° C.: 0.1 g), producing a solution of hydroxy-containing polyester resin (A1-2-1) having a solids content of 70%. The obtained hydroxy-containing polyester resin had an acid value of 46 mg KOH/g, a hydroxy value of 150 mg KOH/g, and a number average molecular weight of 1,400. In the starting material proportions, the proportion of alicyclic polybasic acid in the acid components was 46 mol %, based on the total amount of the acid components.

Preparation Example 8

111 parts of trimethylolpropane, 143 parts of 1,6-hexanediol, 50 parts of 1,2-cyclohexanedicarboxylic acid anhydride, 100 parts of isophthalic acid, and 106 parts of adipic acid were placed into a reaction vessel equipped with a thermometer, thermostat, stirrer, reflux condenser, and water separator. The mixture was heated from 160° C. to 230° C. over 3 hours and subjected to a condensation reaction at 230° C. for 4 hours. Subsequently, to add carboxyl groups to the obtained condensation reaction product, 38 parts of trimellitic anhydride was added and the mixture was allowed to react at 170° C. for 30 minutes. The reaction mixture was then diluted with 2-ethyl-1-hexanol, producing a solution of a hydroxy-containing polyester resin (A1-2-2) having a solids content of 70%. The obtained hydroxy-containing polyester resin had an acid value of 46 mg KOH/g, a hydroxy value of 151 mg KOH/g, and a number average molecular weight of 1,450. In the starting material proportions, the proportion of alicyclic polybasic acid in the acid components was 17 mol %, based on the total amount of the acid components.

Preparation Example 9

A solution of a hydroxy-containing polyester resin (A1-2-3) was obtained in a manner similar to that in Preparation Example 7, except that ethylene glycol mono-2-ethylhexyl ether (the mass that dissolves in 100 g of water at 20° C.: 0.5 g) was used as a dilution solvent in place of 2-ethyl-1-hexanol.

Preparation Example 10

A solution of a hydroxy-containing polyester resin (A1-2-4) was obtained in a manner similar to that in Preparation Example 7 except that propylene glycol mono-n-butyl ether (the mass that dissolves in 100 g of water at 20° C.: 6 g) was used as a dilution solvent in place of 2-ethyl-1-hexanol.

Preparation Example 11

A solution of a hydroxy-containing polyester resin (A1-2-5) was obtained in a manner similar to that in Preparation Example 7 except that ethylene glycol mono-n-butyl ether (the mass that dissolves in 100 g of water at 20° C.: unlimited) was used as a dilution solvent in place of 2-ethyl-1-hexanol.

Preparation of Polymerizable Unsaturated Monomer Having an Aromatic Ring with Nitro Group Bonded Thereto (a)

Preparation Example 12

167 parts of 4-nitrobenzoic acid, 170 parts of ethylene glycol mono-n-butyl ether, 1.5 parts of hydroquinone monomethyl ether (MEHQ), and 1.5 parts of tetrabutyl ammonium bromide were placed into a four-necked reaction vessel equipped with a thermometer, thermostat, stirrer, reflux condenser, air inlet tube and dropper. Subsequently, dry air was passed through the reaction vessel, and the reaction mixture was heated to 130° C. with agitation. Once the temperature reached 130° C., 149 parts of glycidyl methacrylate was added dropwise over 1.5 hours. After completion of the addition, the reaction system was aged at 130° C. for 2 hours while introducing dry air into the reaction liquid by bubbling, then cooled to room temperature, producing a polymerizable unsaturated monomer (a-1) having a solids component of 65% (structural Formula (a-1) shown below).

Formula 7

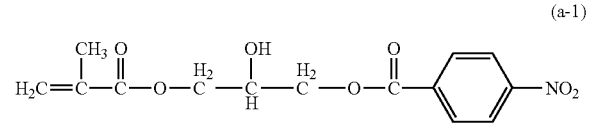

Preparation Example 13

167 parts of 3-nitrobenzoic acid, 170 parts of ethylene glycol mono-n-butyl ether, 1.5 parts of hydroquinone monomethyl ether (MEHQ) and 1.5 parts of tetrabutyl ammonium bromide were placed into a four-necked reaction vessel equipped with a thermometer, thermostat, stirrer, reflux condenser, air inlet tube and dropper. Subsequently, dry air was passed through the reaction vessel, and the reaction mixture was heated to 130° C. with agitation. Once the temperature reached 130° C., 149 parts of glycidyl methacrylate was added dropwise thereto over 1.5 hours. After completion of the addition, while introducing dry air into the reaction liquid by bubbling, the reaction system was aged at 130° C. for 2 hours, then cooled to room temperature, producing a polymerizable unsaturated monomer (a-2) having a solids component of 65% structural Formula (a-2) shown below).

Formula 8

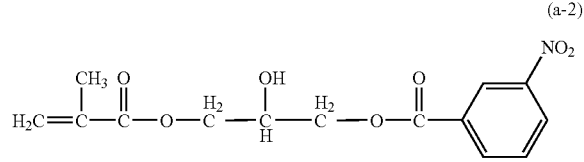

Preparation of Other Polymerizable Unsaturated Monomer (b)

Preparation Example 14

122 parts of benzoic acid, 146 parts of ethylene glycol mono-n-butyl ether, 1.5 parts of hydroquinone monomethyl ether (MEHQ) and 1.5 parts of tetrabutyl ammonium bromide were placed into a four-necked reaction vessel equipped with a thermometer, thermostat, stirrer, reflux condenser, air inlet tube and dropper. Subsequently, dry air was passed through the reaction vessel, and the reaction mixture was heated to 130° C. with agitation. Once the temperature reached 130° C., 149 parts of glycidyl methacrylate was added dropwise thereto over 1.5 hours. After completion of the addition, the reaction system was aged at 130° C. for 1.5 hours while introducing dry air into the reaction liquid by bubbling, then cooled to room temperature, producing a polymerizable unsaturated monomer (b-1) having a solids component of 65%.

Preparation of Resin Composition

Preparation Example 15

35 parts of ethylene glycol mono-n-butyl ether was placed into a reaction vessel equipped with a thermometer, a thermostat, stirrer, reflux condenser, nitrogen inlet tube and dropper, and the reaction system was heated to 95° C. Subsequently, a monomer mixture (1) comprising 31 parts of the polymerizable unsaturated monomer (a-1) obtained in Preparation Example 12 (20 parts of solids content), 10 parts of styrene, 10 parts of 2-hydroxyethyl acrylate, 40 parts of methyl methacrylate and 4 parts of dimethyl-2,2'-azobisisobutyrate and a monomer mixture (2) comprising 40 parts (20 parts of solids content) of "NF Bisomer S20W" (tradename, Dai-Ichi Kogyo Seiyaku Co, Ltd., a polymerizable unsaturated monomer having a polyoxyalkylene chain, a 50% water-diluted product of methoxy polyethylene glycol monomethacrylate represented by Formula (4) in which $R^3$ is a methyl group, $R^4$ is a methyl group, $R^5$ is an ethylene group, m is 45, having a molecular weight of about 2,000) and 20 parts of ethylene glycol mono-n-butyl ether were added dropwise in parallel over 3 hours. After completion of the addition, the reaction system was aged for one hour, and a mixture comprising 10 parts of ethylene glycol mono-n-butyl ether and 1 part of dimethyl-2,2'-azobisisobutyrate was further added dropwise over 1 hour. After completion of the addition, the reaction system was aged for one hour, and 4 parts of ethylene glycol mono-n-butyl ether was added thereto. 25 parts of the reaction solvent was then collected at reduced pressure and at 95° C. Subsequently, the collected product was diluted by adding thereto 25 parts of propylene glycol monomethyl ether, producing a resin composition (D-1) having a solids component of 50%. The obtained resin had a hydroxy value of 84 mg KOH/g, and an average weight molecular weight of 27,000.

Preparation Example 16

35 parts of ethylene glycol mono-n-butyl ether was placed into a reaction vessel equipped with a thermometer, a thermostat, stirrer, reflux condenser, nitrogen inlet tube and dropper, and the reaction system was heated to 95° C. Subsequently, a monomer mixture (1) comprising 31 parts of the polymerizable unsaturated monomer (a-1) obtained in Preparation Example 12 (20 parts of solid component), 4 parts of styrene, 4 parts of 2-hydroxyethyl acrylate, 42 parts of methyl methacrylate and 4 parts of dimethyl-2,2'-azobisisobutyrate, and a monomer mixture (2) comprising 60 parts (30 parts of solids content) of "NF Bisomer S10W" (tradename, Dai-Ichi Kogyo Seiyaku Co, Ltd., a polymerizable unsaturated monomer having a polyoxyalkylene chain, a 50% water-diluted product of methoxy polyethylene glycol monomethacrylate represented by Formula (4) wherein $R^3$ is a methyl group, $R^4$ is a methyl group, $R^5$ is an ethylene group, m is 21, having a molecular weight of about 1,000) and 20 parts of ethylene glycol mono-n-butyl ether were added dropwise in parallel over 3 hours. After completion of the addition, the reaction system was aged for one hour, and a mixture comprising 10 parts of ethylene glycol mono-n-butyl ether and 1 part of dimethyl-2,2'-azobisisobutyrate was further added dropwise over 1 hour. After completion of the addition, the reaction system was aged for one hour, and 4 parts of ethylene glycol mono-n-butyl ether was added thereto. 35 parts of the reaction solvent was then collected at reduced pressure and at 95° C. Subsequently, the collected product was diluted by adding thereto 25 parts of propylene glycol monomethyl ether, producing a resin composition (D-2) having a solids component of 50%. The obtained resin had a hydroxy value of 55 mg KOH/g, and an average weight molecular weight of 22,000.

Preparation Example 17

37 parts of ethylene glycol mono-n-butyl ether was placed into a reaction vessel equipped with a thermometer, thermostat, stirrer, reflux condenser, nitrogen inlet tube and dropper, and the reaction system was heated to 115° C. Subsequently, a mixture of 38 parts (25 parts of solids content) of the polymerizable unsaturated monomer (a-1) obtained in Preparation Example 12, 10 parts of styrene, 5 parts of 2-hydroxyethyl acrylate, 15 parts of "PLACCEL FM-3" (tradename, Daicel Chemical Industries, Ltd., a monomer formed by adding 3 mols of ε-caprolactone per mol of 2-hydroxyethyl methacrylate), 38 parts of methyl methacrylate, 7 parts of methacrylic acid, 4 parts of dimethyl-2,2'-azobisisobutyrate and 20 parts of ethylene glycol monomethyl ether was added dropwise over 4 hours. After the completion of the addition, the reaction system was aged for one hour, and a mixture of 10 parts of ethylene glycol mono-n-butyl ether and 0.5 parts of dimethyl-2,2'-azobisisobutyrate was further added thereto dropwise over 1 hours. After completion of the addition, the reaction system was aged for one hour, and was diluted by adding 15 parts of propylene glycol monomethyl ether, producing a resin composition (D-3) having a solids component of 50%. The obtained resin had a hydroxy value of 87 mg KOH/g, an acid value of 46 mg KOH/g, and an average weight molecular weight of 34,000.

Preparation Examples 18 to 19, 21 to 25

Resin compositions (D-4), (D-5), and (D-7) to (D-11) were obtained in a manner similar to that in Preparation Example 15 except that the starting materials and proportions thereof shown in Table 2 below were used.

Preparation Example 20

A resin composition (D-6) was obtained in a manner similar to that in Preparation Example 15, except that the starting materials and proportions thereof shown in Table 2 below were used, and the amount of the collected reaction solvent was 33 parts.

Table 2 shows the starting material proportions (parts), solid contents (%), hydroxy values (mg KOH/g), acid values (mg KOH/g), and the weight average molecular weight of the resin compositions (D-1) to (D-11).

TABLE 2

|  |  |  | Preparation Example | | | | | | | | | | | |
|---|---|---|---|---|---|---|---|---|---|---|---|---|---|
|  |  |  | 15 | 16 | 17 | 18 | 19 | 20 | 21 | 22 | 23 | 24 | 25 |
| Resin composition | | | D-1 | D-2 | D-3 | D-4 | D-5 | D-6 | D-7 | D-8 | D-9 | D-10 | D-11 |
| Ethylene glycol mono-n-butyl ether | | | 35 | 35 | 37 | 35 | 35 | 35 | 35 | 35 | 35 | 35 | 35 |
| Monomer mixture (1) | Polymerizable unsaturated monomer (a) | Polymerizable unsaturated monomer (a-1) | 31 | 31 | 38 |  | 31 | 38 | 31 | 31 | 31 | 31 |  |
|  |  | Polymerizable unsaturated monomer (a-2) |  |  |  | 31 |  |  |  |  |  |  |  |

TABLE 2-continued

|  |  |  | Preparation Example | | | | | | | | | | |
|---|---|---|---|---|---|---|---|---|---|---|---|---|---|
|  |  |  | 15 | 16 | 17 | 18 | 19 | 20 | 21 | 22 | 23 | 24 | 25 |
|  | Polymerizable unsaturated monomer (b) | Styrene | 10 | 4 | 10 | 10 |  | 10 | 10 | 10 | 10 | 10 | 10 |
|  |  | 2-Hydroxyethyl acrylate | 10 | 4 | 5 |  | 5 |  | 10 | 10 | 10 | 10 | 10 |
|  |  | 4-Hydroxybutyl acrylate |  |  |  | 10 |  |  |  |  |  |  |  |
|  |  | "PLACCEL FM-3" |  |  | 15 |  |  |  |  |  |  |  |  |
|  |  | Methyl methacrylate | 40 | 42 | 38 | 40 | 55 | 40 | 3 | 35 | 37 | 33.5 | 40 |
|  |  | n-Butyl acrylate |  |  |  |  |  |  | 37 |  |  |  |  |
|  |  | Dimethylaminoethyl methacrylate |  |  |  |  |  |  |  |  | 5 |  | 5 |
|  |  | 2-(Methacryloyloxy)-ethyltrimethyl-ammonium chloride |  |  |  |  |  |  |  |  | 3 | 1.5 |  |
|  |  | Methacrylic acid |  |  | 7 |  |  |  |  |  |  |  |  |
|  |  | Polymerizable unsaturated monomer (b-1) |  |  |  |  |  |  |  |  |  |  | 31 |
|  | Dimethyl-2,2'-azobisisobutylate | | 4 | 4 | 4 | 4 | 4 | 4 | 4 | 4 | 4 | 4 | 4 |
|  | Ethylene glycol monomethyl ether | |  |  | 20 |  |  |  |  |  |  |  |  |
| Monomer mixture (2) | Polymerizable unsaturated monomer (b) | "NF Bisomer S20W" | 40 |  |  | 40 | 40 | 50 | 40 | 40 | 40 | 40 | 40 |
|  |  | "NF Bisomer S10W" |  | 60 |  |  |  |  |  |  |  |  |  |
|  | Ethylene glycol mono-n-butyl ether | | 20 | 20 |  | 20 | 20 | 20 | 20 | 20 | 20 | 20 | 20 |
| Ethylene glycol mono-n-butyl ether | | | 10 | 10 | 10 | 10 | 10 | 10 | 10 | 10 | 10 | 10 | 10 |
| Dimethyl-2,2'-azobisisobutylate | | | 1 | 1 | 0.5 | 1 | 1 | 1 | 1 | 1 | 1 | 1 | 1 |
| Ethylene glycol mono-n-butyl ether | | | 4 | 4 | 0 | 4 | 4 | 4 | 4 | 4 | 4 | 4 | 4 |
| Propylene glycol monomethyl ether | | | 25 | 25 | 20 | 25 | 25 | 25 | 25 | 25 | 25 | 25 | 25 |
| Solids content (mass %) | | | 50 | 50 | 50 | 50 | 50 | 50 | 50 | 50 | 50 | 50 | 50 |
| Hydroxy value (mg KOH/g) | | | 84 | 55 | 87 | 75 | 84 | 45 | 84 | 84 | 84 | 84 | 48 |
| acid value (mg KOH/g) | | | 0 | 0 | 46 | 0 | 0 | 0 | 0 | 0 | 0 | 0 | 0 |
| Weight average molecular weight (×10$^3$) | | | 27 | 22 | 34 | 30 | 25 | 33 | 28 | 20 | 21 | 23 | 25 |

Among the resin compositions (D-1) to (D-11) in Table 2, the resins (D-1) to (D-10) correspond to the resin having an aromatic ring with a nitro group bonded thereto.

Preparation of Pigment Dispersion

Preparation Example 26

50 parts (25 parts of solids content) of the resin composition (D-1) obtained in Preparation Example 15, 50 parts of "HOSTAPERM VIOLET RL SPECIAL" (tradename, Clariant, dioxazine pigment, C.I. Pigment Violet 23) and 100 parts of deionized water were placed into were placed into a wide-mouthed glass bottle having a capacity of 225 cc. Glass beads having a diameter of about 1.3 mm were added to the bottle as a dispersion medium, which was then hermetically sealed, and the mixture was dispersed for 4 hours by a paint shaker, producing a dioxazine pigment dispersion (P1).

Preparation Examples 27 to 36

Dioxazine pigment dispersions (P2) to (P11) were obtained in a manner similar to that in Preparation Example 26, except that the starting materials and proportions thereof shown in Table 3 below were used in Preparation Example 26.

TABLE 3

|  |  |  | Preparation Example | | | | | | | | | | |
|---|---|---|---|---|---|---|---|---|---|---|---|---|---|
|  |  |  | 26 | 27 | 28 | 29 | 30 | 31 | 32 | 33 | 34 | 35 | 36 |
| Name of dioxazine pigment dispersion | | | P1 | P2 | P3 | P4 | P5 | P6 | P7 | P8 | P9 | P10 | P11 |
| Dioxazine pigment (B) | | "HOSTAPERM VIOLET RL SPECIAL" | 50 | 50 | 50 | 50 | 50 | 50 | 50 | 50 | 50 | 50 | 50 |
| Resin composition | Resin (D) having an aromatic ring with a nitro group bonded thereto | D-1 | 50 |  |  |  |  |  |  |  |  |  |  |
|  |  | D-2 |  | 50 |  |  |  |  |  |  |  |  |  |
|  |  | D-3 |  |  | 50 |  |  |  |  |  |  |  |  |
|  |  | D-4 |  |  |  | 50 |  |  |  |  |  |  |  |
|  |  | D-5 |  |  |  |  | 50 |  |  |  |  |  |  |
|  |  | D-6 |  |  |  |  |  | 50 |  |  |  |  |  |
|  |  | D-7 |  |  |  |  |  |  | 50 |  |  |  |  |
|  |  | D-8 |  |  |  |  |  |  |  | 50 |  |  |  |
|  |  | D-9 |  |  |  |  |  |  |  |  | 50 |  |  |
|  |  | D-10 |  |  |  |  |  |  |  |  |  | 50 |  |
|  |  | D-11 |  |  |  |  |  |  |  |  |  |  | 50 |

TABLE 3-continued

| | Preparation Example | | | | | | | | | | |
|---|---|---|---|---|---|---|---|---|---|---|---|
| | 26 | 27 | 28 | 29 | 30 | 31 | 32 | 33 | 34 | 35 | 36 |
| Deionized water | 100 | 100 | 98.4 | 100 | 100 | 100 | 100 | 100 | 100 | 100 | 100 |
| 2-(Dimethylamono)ethanol | | | 1.6 | | | | | | | | |

Preparation Example 37

46 parts (25 parts of solids content) of the hydroxy-containing acrylic resin (A-1-6) obtained in Preparation Example 6, 100 parts of "JR-806" (tradename, Tayca Corporation, rutile-type titanium dioxide) and 54 parts of deionized water were placed into a wide-mouthed glass bottle having a capacity of 225 cc. Glass beads having a diameter of about 1.3 mm were added to the bottle as a dispersion medium, which was then hermetically sealed, and the mixture was dispersed for 4 hours by a paint shaker, producing a titanium dioxide pigment dispersion (P12).

Preparation Example 38

In a stirring and mixing container, 19 parts of an aluminum pigment paste (tradename "GX-180A", manufactured by Asahi Kasei Metals, Ltd., aluminum content: 74%), 35 parts of 2-ethyl-1-hexanol, 8 parts of a phosphoric acid group-containing resin solution described below, and 0.2 parts of 2-(dimethylamino)ethanol were uniformly mixed, producing an effect pigment dispersion (P13).

Phosphoric acid group-containing resin solution: A mixed solvent of 27.5 parts of methoxypropanol and 27.5 parts of isobutanol was placed into a reaction vessel equipped with a thermometer, thermostat, stirrer, reflux condenser, and dropper, and was heated to 110° C. While the mixture was maintained at 110° C., 121.5 parts of a mixture of 25 parts of styrene, 27.5 parts of n-butyl methacrylate, 20 parts of a branched higher alkyl acrylate (tradename "Isostearyl Acrylate", manufactured by Osaka Organic Chemical Industry, Ltd.), 7.5 parts of 4-hydroxybutyl acrylate, 15 parts of a phosphoric acid group-containing polymerizable monomer described below, 12.5 parts of acid phosphoxyethyl methacrylate, 10 parts of isobutanol, and 4 parts of t-butylperoxyoctanoate was added dropwise to the mixed solvent over a period of 4 hours. Subsequently, a mixture of 0.5 parts of t-butylperoxyoctanoate and 20 parts of isopropanol was added dropwise for 1 hour and then aged for 1 hour, thus producing a phosphoric acid group-containing resin solution with a solids content of 50%. The phosphoric acid group-containing acrylic resin had an acid value of 83 mgKOH/g, a hydroxy value of 29 mgKOH/g, and a weight average molecular weight of 10,000.

Phosphoric acid group-containing polymerizable monomer: A reaction vessel equipped with a thermometer, thermostat, stirrer, reflux condenser, and dropper was loaded with a mixed solvent of 57.5 parts of monobutylphosphoric acid and 41 parts of isobutanol, and was heated to 90° C. After adding 42.5 parts of glycidyl methacrylate dropwise over a period of 2 hours, the mixture was aged for 1 hour. Subsequently, 59 parts of isopropanol was added, producing a phosphoric acid group-containing polymerizable monomer solution with a solids content of 50%. The obtained monomer had an acid value of 285 mgKOH/g.

Preparation Example 39

An effect pigment dispersion (P14) was prepared in a manner similar to that in Preparation Example 38, except that ethylene glycol mono-2-ethylhexyl ether (the mass that dissolves in 100 g of water at 20° C.: 0.5 g) was used in place of 2-ethyl-1-hexanol.

Preparation Example 40

A solution of an effect pigment dispersion (P15) was obtained in a manner similar to that in Preparation Example 38, except that propylene glycol mono-n-butyl ether (the mass that dissolves in 100 g of water at 20° C.: 6 g) was used as a dilution solvent in place of 2-ethyl-1-hexanol.

Preparation Example 41

In a stirring and mixing container, 19 parts of an aluminum pigment paste (tradename "STAPA HYDROLAC PMH 3540", manufactured by Eckart, aluminum content: 72%), 35 parts of 2-ethyl-1-hexanol, 8 parts of the above-mentioned phosphoric acid group-containing resin solution and 0.2 parts of 2-(dimethylamino) ethanol were uniformly mixed, producing an effect pigment dispersion (P16).

Preparation Example 42

In a stirring and mixing container, 19 parts of an aluminum pigment paste (tradename "STAPA HYDROLAC PMH 3540", manufactured by Eckart, aluminum content: 72%) and 35 parts of 2-ethyl-1-hexanol were uniformly mixed, producing an effect pigment dispersion (P17).

Preparation Example 43

An effect pigment dispersion (P18) was obtained in a manner similar to that in Preparation Example 38, except that ethylene glycol mono-n-butyl ether (the mass that dissolves in 100 g of water at 20° C.: unlimited) was used as a dilution solvent in place of 2-ethyl-1-hexanol.

Preparation of the Aqueous Coating Composition

Example 1

One hundred parts of the water-dispersible hydroxy-containing acrylic resin aqueous dispersion (A1-1-1) obtained in Preparation Example 1, 57 parts of the hydroxy-containing polyester resin solution (A1-2-1) obtained in Preparation Example 7, 50 parts of melamine resin (A2-1) (a methyl-butyl-etherified melamine resin, solids content: 60%, weight average molecular weight: 2,000), 4 parts of the dioxazine pigment dispersion (P1) obtained in Preparation Example 26, 25 parts of the titanium dioxide pigment dispersion (P12) obtained in Preparation Example 37, and 62 parts of the effect pigment dispersion (P13) obtained in Preparation Example 38 were placed into a stirring and mixing container, and uniformly mixed. "Primal ASE-60", 2-(dimethylamino)ethanol and deionized water were added thereto, producing an aqueous coating composition (X1) having a pH of 8.0, a solids content of 25%, and a viscosity of 50 seconds as measured at 20° C. using Ford Cup No. 4.

Examples 2 to 21 and Comparative Examples 1 to 2

Aqueous coating compositions (X2) to (X23) were obtained in a manner similar to that in Example 1 except that the starting materials and proportions thereof shown in Table 4 below were used in Example 1. The aqueous coating compositions (X2) to (X23) had a pH of 8.0, a solids content of 25%, and a viscosity of 50 seconds at 20° C. using Ford Cup No. 4.

TABLE 4

| | | | Example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 |
| Name of aqueous coating composition | | | X1 | X2 | X3 | X4 | X5 | X6 | X7 | X8 | X9 | X10 | X11 | X12 |
| Film-forming aqueous resin (A1) | Hydroxy-containing acrylic Resin (A1-1) | Aqueous dispersion of water-dispersible hydroxy-containing resin (A1-1-1) | 100 | | | | | 100 | 100 | 100 | 100 | 100 | 100 | 100 |
| | | Aqueous dispersion of water-dispersible hydroxy-containing resin (A1-1-2) | | 100 | | | | | | | | | | |
| | | Aqueous dispersion of water-dispersible hydroxy-containing resin (A1-1-3) | | | 100 | | | | | | | | | |
| | | Aqueous dispersion of water-dispersible hydroxy-containing resin (A1-1-4) | | | | 100 | | | | | | | | |
| | | Aqueous dispersion of water-dispersible hydroxy-containing resin (A1-1-5) | | | | | 100 | | | | | | | |
| | Hydroxy-containing polyester resin (A1-2) | Hydroxy-containing polyester resin solution (A1-2-1) | 57 | 57 | 57 | 57 | 57 | | 57 | 57 | | | 57 | 57 |
| | | Hydroxy-containing polyester resin solution (A1-2-2) | | | | | | 57 | | | | | | |
| | | Hydroxy-containing polyester resin solution (A1-2-3) | | | | | | | | | 57 | | | |
| | | Hydroxy-containing polyester resin solution (A1-2-4) | | | | | | | | | | 57 | | |
| Curing agent (A2) | Melamine resin | Melamine resin (A2-1) | 50 | 50 | 50 | 50 | 50 | 50 | | 40 | 50 | 50 | 50 | 50 |
| | | Melamine resin (A2-2) (Note 1) | | | | | | | 38 | | | | | |
| | Blocked poly-isocyanate | "BYHYDUR VPLS2310" (Note 2) | | | | | | | | | 15 | | | |
| Dioxazine pigment dispersion | Type | | P1 | P1 | P1 | P1 | P1 | P1 | P1 | P1 | P1 | P1 | P1 | P1 |
| | Amount | | 4 | 4 | 4 | 4 | 4 | 4 | 4 | 4 | 4 | 4 | 4 | 4 |
| Titanium dioxide pigment dispersion (P12) | | | 25 | 25 | 25 | 25 | 25 | 25 | 25 | 25 | 25 | 25 | 25 | 25 |
| Effect pigment dispersion (P13) | | | 62 | 62 | 62 | 62 | 62 | 62 | 62 | 62 | | | | |
| Effect pigment dispersion (P14) | | | | | | | | | | | 62 | | | |
| Effect pigment dispersion (P15) | | | | | | | | | | | | 62 | | |
| Effect pigment dispersion (P16) | | | | | | | | | | | | | 62 | |
| Effect pigment dispersion (P17) | | | | | | | | | | | | | | 54 |

| | | | Example | | | | | | | | | Comp. Example | |
|---|---|---|---|---|---|---|---|---|---|---|---|---|---|
| | | | 13 | 14 | 15 | 16 | 17 | 18 | 19 | 20 | 21 | 1 | 2 |
| Name of aqueous coating composition | | | X13 | X14 | X15 | X16 | X17 | X18 | X19 | X20 | X21 | X22 | X23 |
| Film-forming aqueous resin (A1) | Hydroxy-containing acrylic resin (A1-1) | Aqueous dispersion of water-dispersible hydroxy-containing resin (A1-1-1) | 100 | 100 | 100 | 100 | 100 | 100 | 100 | 100 | 100 | 100 | 100 |

TABLE 4-continued

| | | | 1 | 2 | 3 | 4 | 5 | 6 | 7 | 8 | 9 | 10 | 11 |
|---|---|---|---|---|---|---|---|---|---|---|---|---|---|
| | Hydroxy-containing polyester resin (A1-2) | Hydroxy-containing polyester resin solution (A1-2-1) | 57 | 57 | 57 | 57 | 57 | 57 | 57 | 57 | 57 | 57 | |
| | | Hydroxy-containing polyester resin solution (A1-2-5) | | | | | | | | | | | 57 |
| Curing agent (A2) | Melamine resin | Melamine resin (A2-1) | 50 | 50 | 50 | 50 | 50 | 50 | 50 | 50 | 50 | 50 | 50 |
| Dioxazine pigment dispersion | Type | | P2 | P3 | P4 | P5 | P6 | P7 | P8 | P9 | P10 | P11 | P1 |
| | Amount | | 4 | 4 | 4 | 4 | 4 | 4 | 4 | 4 | 4 | 4 | 4 |
| Titanium dioxide pigment dispersion (P12) | | | 25 | 25 | 25 | 25 | 25 | 25 | 25 | 25 | 25 | 25 | 25 |
| Effect pigment dispersion (P13) | | | 62 | 62 | 62 | 62 | 62 | 62 | 62 | 62 | 62 | 62 | |
| Effect pigment dispersion (P18) | | | | | | | | | | | | | 62 |

(Note 1) Melamine resin (A2-2): methylated melamine resin, solids content: 80%, weight average molecular weight: 800.
(Note 2) "BYHYDUR VPLS2310": tradename, Sumika Bayer Urethane Co., Ltd., a blocked polyisocyanate compound; solid content 38%.

Preparation of Substrates

Preparation Example 44

A thermosetting epoxy resin cationic electrodeposition coating composition (tradename "Electron GT-10", manufactured by Kansai Paint Co., Ltd.) was applied by electrodeposition to zinc phosphate-treated cold-rolled steel plates 300 mm in length and 450 mm in width to a film thickness of 0.8 mm, and cured by heating at 170° C. for 30 minutes. Subsequently, an intermediate coating composition (tradename "TP-65-2", manufactured by Kansai Paint Co., Ltd., a polyester resin/amino resin organic solvent-based coating composition) was applied to this electrodeposition coated film to a film thickness of 35 μm, and cured by heating at 140° C. for 30 minutes. Substrates comprising a steel plate and an electrodeposition coated film and an intermediate coated film formed on the steel plate were thus prepared.

Method for Forming Coated Films

Example 22

A multilayer coated film comprising a base coating and a clear coating on a substrate was formed by using the aqueous coating composition (X1) obtained in Example 1 as a base coating composition in the above two-coat one-bake Method I for forming a multilayer coated film.

More specifically, the aqueous coating composition (X1) immediately after being produced (within one hour from production) was applied to the substrate obtained in Preparation Example 44 to a film thickness of 15 μm using a rotary atomizer, then allowed to stand for 2 minutes, and preheated at 80° C. for 3 minutes. Subsequently, an acrylic resin organic solvent-based clear topcoat composition (tradename "Magicron KINO-1210", manufactured by Kansai Paint Co., Ltd.) was applied to the uncured coating surface to a film thickness of 40 μm, then allowed to stand for 7 minutes, and heated at 140° C. for 30 minutes to cure both coatings at the same time. A test plate 1 consisting of a substrate and a multilayer coated film comprising a base coating and a clear coating formed thereon was thus obtained.

A test plate 2 on which the aqueous coating composition (X1) after being stored was applied was obtained in a manner similar to the method for producing the above-mentioned test plate 1, except that the aqueous coating composition (X1), which had been stored at 40° C. for 30 days, was used in place of the aqueous coating composition (X1) immediately after being produced.

A test plate 3 for testing anti-popping property was obtained in a manner similar to the method for producing the test plate 1, except that the aqueous coating composition (X1) was applied to a film thickness of 25 μm.

Examples 23 to 42 and Comparative Examples 3 to 4

Test plates of Examples 23 to 42 and Comparative Examples 3 to 4 were obtained in a manner similar to that of Example 22, except that the aqueous coating compositions shown in Table 5 were used in place of the aqueous coating composition (X1) in Example 22.

Evaluation Test

Coating Composition Performance Test

Storage stability: The test plate 1 on which the aqueous coating compositions immediately after being produced obtained in Examples 22 to 42 and Comparative Examples 3 to 4 were applied, and the test plate 2 on which the coating compositions that had been stored at 40° C. for 30 days were applied were tested using a multi-angle spectrocolorimeter "CM-512m3" (manufactured by Konica Minolta) by irradiating the test plates with light from an angle of 25° relative to the axis perpendicular to the coated film face, and subjecting light oriented perpendicularly to the coated film face among reflected lights to colorimetry to determine its L*, a*, b* values, calculating a color difference ΔE* (JIS K 5600-4-6 (1999)) between the test plate 1 and the test plate 2. The smaller the ΔE*, the smaller the change in color due to storage, and the higher the storage stability of the coating composition. For example, in terms of practical use, ΔE* is preferably 2.5 or lower, and more preferably 2 or lower.

Coated Film Performance Test

Anti-popping property: Among the test plates obtained in the above-mentioned Examples 22 to 42 and Comparative Examples 3 to 4, the test plate 3 was observed was observed with the naked eye, and was evaluated on the following scale.
A: No occurrence of popping is found on the test plate,
B: 1 to 2 occurrences of popping are found on the test plate,
C: 3 to 9 occurrences of popping are found on the test plate,
D: 10 or more occurrences of popping are found on the test plate.

Among the test plates obtained in the above-mentioned Examples 22 to 42 and Comparative Examples 3 to 4, the test plate 1 was used to determine its smoothness, flip-flop property, metallic mottling and water resistance. The test methods are as follows:

Smoothness: The test plates were evaluated for their smoothness, based on the Long Wave (LW) value determined by "Wave Scan" (tradename, BYK-Gardner GmbH). The lower the LW value, the higher the smoothness of the coated film surface.

Flip-flop property: The test plates were observed with the naked eye from various angles, and their flip-flop properties were evaluated according to the following criteria:
A: A remarkable variation of its metallic texture depending on the angle of viewing is found (extremely high flip-flop property),
B: A good variation of its metallic texture depending on the angle of viewing is found (good flip-flop property),
C: Variation of its metallic texture depending on the angle of viewing is low (low flip-flop property),
D: Variation of its metallic texture depending on the angle of viewing is very low (very poor flip-flop property).

Metallic mottling: The test plates were observed with the naked eye, and the degree of occurrence of metallic mottling was evaluated according to the following criteria:
A: Substantially no metallic mottling was observed, and the coated film has an extremely excellent appearance.
B: A small amount of metallic mottling was observed, but the coated film has an excellent appearance.
C: Metallic mottling was observed, and the coated film has a poor appearance.
D: A considerable amount of metallic mottling was observed, and the coated film has a very poor appearance.

Water resistance: Each test plate was immersed in 40° C. warm water for 240 hours, then removed and dried at 20° C. for 12 hours. Subsequently, cross-cuts reaching the substrate were made in the multilayer coated film on the test plate using a cutter knife to form a grid of 100 squares (2 mm×2 mm). Subsequently, an adhesive cellophane tape was applied to the surface of the cross-cut coated film and abruptly peeled off at 20° C. The remainability of the cross-cut coated film squares was then checked. The water resistance was evaluated according to the following criteria:
A: 100 squares remained, and no edge chipping occurred.
B: 100 squares remained, but edge chipping occurred.
C: 90 to 99 squares remained.
D: The number of remaining squares was 89 or less.

Table 5 shows the results of the coated film performance evaluation tests.

The invention claimed is:

1. An aqueous coating composition comprising (A1) a film-forming aqueous resin, (B) a dioxazine pigment, (C) a hydrophobic solvent and (D) a resin having an aromatic ring with a nitro group bonded thereto.

2. An aqueous coating composition according to claim 1, which further comprises a curing agent (A2).

3. An aqueous coating composition according to claim 2, wherein the film-forming aqueous resin (A1) is a core-shell type water-dispersible hydroxy-containing acrylic resin (A1-1') comprising a core portion that is a copolymer (I) comprising, as copolymer components, 0.1 to 30 mass % of a polymerizable unsaturated monomer having two or more polymerizable unsaturated groups per molecule and 70 to 99.9 mass % of a polymerizable unsaturated monomer having one polymerizable unsaturated group per molecule, and a shell portion that is a copolymer (II) comprising, as copolymer components, 1 to 40 weight % of a hydroxy-containing polymerizable unsaturated monomer, 5 to 50 mass % of a hydrophobic polymerizable unsaturated monomer and 10 to 94 mass % of other polymerizable unsaturated monomer, and the mass ratio of the copolymer (I)/copolymer (II) is in the range from 10/90 to 90/10 on a solids content basis.

4. An aqueous coating composition according to claim 1, wherein the dioxazine pigment (B) is C. I. Pigment Violet 23 (C. I. No. 51319).

5. An aqueous coating composition according to claim 1, wherein the hydrophobic solvent (C) is at least one hydrophobic solvent selected from the group consisting of 1-octanol, 2-octanol, 2-ethyl-1-hexanol, ethylene glycol mono-2-ethylhexyl ether, propylene glycol mono n-butyl ether and dipropylene glycol mono-n-butyl ether.

6. An aqueous coating composition according to claim 1, wherein the resin (D) having an aromatic ring with a nitro group bonded thereto is a copolymer that can be obtained by copolymerization of monomer components comprising a polymerizable unsaturated monomer (a) represented by Formula (1) shown below

TABLE 5

| | | Name of aqueous coating composition | Storage stability $\Delta E^*$ | Appearance | | | | |
|---|---|---|---|---|---|---|---|---|
| | | | | Anti-popping property | Smoothness | Flip-flop property | Metallic mottling | Water resistance |
| Example | 22 | X1 | 0.3 | A | 10 | A | A | A |
| | 23 | X2 | 0.4 | A | 12 | A | B | A |
| | 24 | X3 | 0.4 | A | 15 | A | B | A |
| | 25 | X4 | 0.4 | A | 20 | B | B | B |
| | 26 | X5 | 0.3 | A | 20 | B | B | B |
| | 27 | X6 | 0.4 | A | 12 | A | A | A |
| | 28 | X7 | 0.3 | A | 10 | A | A | B |
| | 29 | X8 | 0.4 | A | 12 | A | A | A |
| | 30 | X9 | 0.4 | A | 10 | A | B | A |
| | 31 | X10 | 0.2 | B | 13 | B | B | A |
| | 32 | X11 | 0.4 | A | 11 | B | A | A |
| | 33 | X12 | 0.4 | A | 12 | B | B | B |
| | 34 | X13 | 1.2 | A | 10 | A | A | A |
| | 35 | X14 | 2.0 | A | 10 | A | A | A |
| | 36 | X15 | 1.2 | A | 10 | A | A | A |
| | 37 | X16 | 1.1 | A | 10 | A | A | A |
| | 38 | X17 | 1.0 | A | 10 | A | A | B |
| | 39 | X18 | 1.0 | A | 10 | A | A | A |
| | 40 | X19 | 1.2 | A | 10 | A | A | A |
| | 41 | X20 | 1.1 | A | 10 | A | A | A |
| | 42 | X21 | 1.1 | A | 10 | A | A | A |
| Comp. Example | 3 | X22 | 5.0 | A | 10 | A | B | A |
| | 4 | X23 | 0.5 | D | 15 | C | C | A |

Formula 1

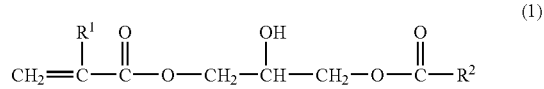
(1)

(wherein R¹ represents a hydrogen atom or a methyl group; and R² represents an aromatic ring having a nitro group bonded thereto)
and (b) other polymerizable unsaturated monomer.

7. An aqueous coating composition according to claim 6, wherein the polymerizable unsaturated monomer (a) is a polymerizable unsaturated monomer represented by the following Formula (2)

Formula 2

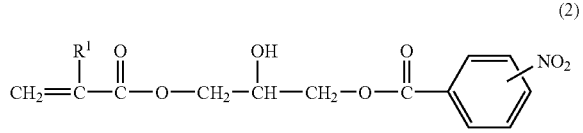
(2)

(wherein R¹ represents a hydrogen atom or a methyl group).

8. An aqueous coating composition according to claim 6, wherein the mass ratio of the polymerizable unsaturated monomer (a) to the other polymerizable unsaturated monomer (b) is in the range from 5/95 to 50/50.

9. An aqueous coating composition according to claim 6, wherein the other polymerizable unsaturated monomer (b) contains, as a part of the monomer (b), a polymerizable unsaturated monomer having a polyoxyalkylene chain in an amount of 5 to 50 mass %, based on the total mass of the polymerizable unsaturated monomer (a) and the monomer (b).

10. An aqueous coating composition according claim 1, wherein the film-forming aqueous resin (A1), the dioxazine pigment (B), the hydrophobic solvent (C) and the resin (D) having an aromatic ring with a nitro group bonded thereto are contained in the following amounts: 0.01 to 15 mass parts of the dioxazine pigment (B), based on 100 mass parts of the film-forming aqueous resin (A1); 10 to 120 mass parts of the hydrophobic solvent (C), based on 100 mass parts of the film-forming aqueous resin (A1); and 20 to 300 mass parts of the resin (D) having an aromatic ring with a nitro group bonded thereto, based on 100 mass parts of the dioxazine pigment (B).

11. An article on which an aqueous coating composition according to claim 1 is applied.

12. A method, for forming a multi-layer coated film comprising:
 (1) a step in which an aqueous coating composition according to claim 1 is applied onto a substrate, to form a base coating;
 (2) a step in which a clear coating composition is applied onto the uncured base coating surface to form a clear coating; and
 (3) a step in which the uncured base coating and uncured clear coating are heated to cure both coated films simultaneously.

13. An article coated by a method for forming a multi-layer coated film according to claim 12.

* * * * *